US006830396B2

(12) United States Patent
Kurriss

(10) Patent No.: US 6,830,396 B2
(45) Date of Patent: Dec. 14, 2004

(54) KEYBOARD CONFIGURATION SYSTEM

(76) Inventor: Francis N. Kurriss, Kurriss Exponential Investing, 6180 Canterbury Dr., Culver City, CA (US) 90230

(*) Notice: Subject to any disclaimer, the term of this patent is extended or adjusted under 35 U.S.C. 154(b) by 12 days.

(21) Appl. No.: 10/405,120

(22) Filed: Mar. 31, 2003

(65) Prior Publication Data

US 2004/0202501 A1 Oct. 14, 2004

(51) Int. Cl.[7] .................................................. B41J 5/08
(52) U.S. Cl. .................... 400/486; 400/489; 400/472
(58) Field of Search .............................. 400/472–474, 400/477, 479–479.2, 480, 486, 489, 100, 414, 663; 345/168, 172; 341/20–23

(56) References Cited

U.S. PATENT DOCUMENTS

| | | |
|---|---|---|
| 185,714 A | 12/1876 | Allen |
| 3,847,263 A | 11/1974 | X ................................ 97/100 |
| 4,519,721 A | 5/1985 | Gardner ...................... 400/472 |
| 4,613,247 A | 9/1986 | McGunnigle ............... 400/486 |
| 4,633,227 A | 12/1986 | Menn .......................... 340/365 |
| 4,715,736 A | 12/1987 | McGunnigle ............... 400/484 |
| 4,824,268 A | 4/1989 | Diernisse H. V. ........... 400/486 |
| 4,927,279 A | 5/1990 | Morgan ...................... 400/486 |
| 5,387,042 A | 2/1995 | Brown ........................ 400/477 |
| D368,708 S | 4/1996 | Maynard et al. ........... D14/115 |
| 5,584,588 A | 12/1996 | Harbaugh ................... 400/486 |
| 5,836,705 A | 11/1998 | Choate ....................... 400/486 |
| 5,879,089 A | * 3/1999 | Armel |
| 6,053,647 A | 4/2000 | Parkinson ................... 400/486 |
| 6,632,038 B2 | * 10/2003 | Trotman ...................... 400/489 |

FOREIGN PATENT DOCUMENTS

| | | | |
|---|---|---|---|
| GB | 0066991 | 5/1982 | .............. B41J/5/10 |

* cited by examiner

*Primary Examiner*—Minh Chau

(57) ABSTRACT

A system for configuring keyboards using both frequency and alphabetical bases. The Keyboard Configuration System uses alphabetized frequency-based sets of keys in rows in order to fulfill the requirement that the keyboard must provide a key for each letter of the alphabet. The alphabet is analyzed for letter use on a frequency basis. The frequency-ranked list is then broken into rows according to the number of rows needed for the keyboard. Each row resulting from the frequency-ranked list is then alphabetized independently so that each resulting key row represents a certain segment of the frequency-ranked list. Each key row is alphabetized separately. Each key row may be of different length and the resulting keyboard may have a number of configurations depending upon the relative shift between each of the independently arranged key rows. Generally, the longest key row determines the number of key row shifts, or cases, as left or right justification rules generally apply. The resulting keyboards are then evaluated for demerits according to motion that is backward relative to the alphabetical direction as well as motion that is excess forward of zero or one key columns relative to the alphabetical direction. The resulting demerit tallies for all available keyboard candidates are evaluated with those keyboard configurations or cases having the lowest number of demerits being prime candidates for implementation as an actual keyboard. The system set forth here may be adaptable to any written language, especially those based upon phonetic alphabets.

8 Claims, 12 Drawing Sheets

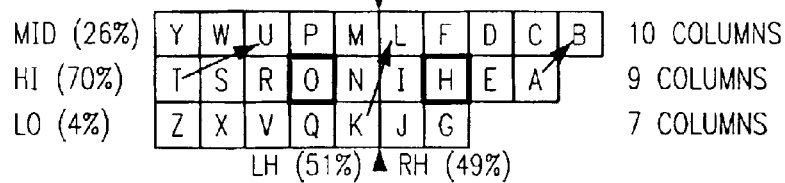
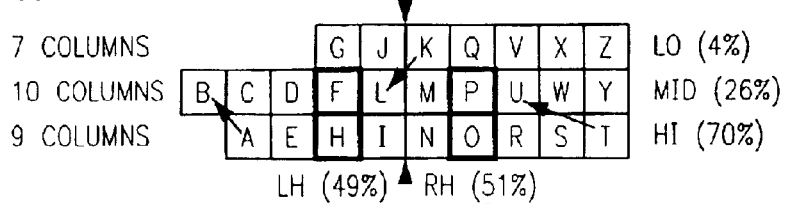
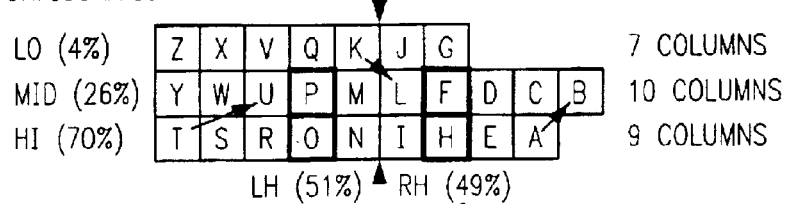

FIG. 7
CONFIGURATION: VII

| | | | | | | | | | | |
|---|---|---|---|---|---|---|---|---|---|---|
| LO (4%) | | Z | X | V | Q | K | J | G | | 7 COLUMNS |
| HI (70%) | T | S | R | O | N | I | H | E | A | 9 COLUMNS |
| MID (26%) | Y | W | U | P | M | L | F | D | C | B | 10 COLUMNS |

LH (51%) ▲ RH (49%)

{ DESCENDING ALPHABET WITHIN FREQUENCY (LO/HI/MID) SETS

{ APPLICABLE FOR LAYOUTS WITH MAXIMUM OF 10 COLUMNS

FIG. 8
CONFIGURATION: VIII

| | | | | | | | | | | |
|---|---|---|---|---|---|---|---|---|---|---|
| 9 COLUMNS | | A | E | H | I | N | O | R | S | T | HI (70%) |
| 10 COLUMNS | B | C | D | F | L | M | P | U | W | Y | MID (26%) |
| 7 COLUMNS | | | | G | J | K | Q | V | X | Z | LO (4%) |

LH (49%) ▲ RH (51%)

{ ASCENDING ALPHABET WITHIN FREQUENCY (HI/MID/LO) SETS

{ APPLICABLE FOR LAYOUTS WITH MAXIMUM OF 10 COLUMNS

FIG. 9
CONFIGURATION: IX

| | | | | | | | | | | |
|---|---|---|---|---|---|---|---|---|---|---|
| MID (25%) | Y | W | U | P | M | L | F | D | C | 9 COLUMNS |
| HI (70%) | T | S | R | O | N | I | H | E | A | 9 COLUMNS |
| LO (5%) | Z | X | V | Q | K | J | G | B | | 8 COLUMNS |

LH (51%) ▲ RH (49%)

{ DESCENDING ALPHABET WITHIN FREQUENCY (MID/HI/LO) SETS

{ APPLICABLE FOR LAYOUTS WITH MAXIMUM OF 9 COLUMNS

FIG. 10
CONFIGURATION: X

| | B | G | J | K | Q | V | X | Z | LO (5%) |
8 COLUMNS

| C | D | F | L | M | P | U | W | Y | MID (25%)
9 COLUMNS

| A | E | H | I | N | O | R | S | T | HI (70%)
9 COLUMNS

LH (49%) ▲ RH (51%)

{ ASCENDING ALPHABET WITHIN FREQUENCY (LO/MID/HI) SETS }   { APPLICABLE FOR LAYOUTS WITH MAXIMUM OF 9 COLUMNS }

FIG. 11
CONFIGURATION: XI

LO (5%) | Z | X | V | Q | K | J | G | B |   8 COLUMNS
MID (25%) | Y | W | U | P | M | L | F | D | C |   9 COLUMNS
HI (70%) | T | S | R | O | N | I | H | E | A |   9 COLUMNS

LH (51%) ▲ RH (49%)

{ DESCENDING ALPHABET WITHIN FREQUENCY (LO/MID/HI) SETS }   { APPLICABLE FOR LAYOUTS WITH MAXIMUM OF 9 COLUMNS }

FIG. 12
CONFIGURATION: XII

9 COLUMNS | C | D | F | L | M | P | U | W | Y |   MID (25%)
9 COLUMNS | A | E | H | I | N | O | R | S | T |   HI (70%)
8 COLUMNS | B | G | J | K | Q | V | X | Z |   LO (5%)

LH (49%) ▲ RH (51%)

{ ASCENDING ALPHABET WITHIN FREQUENCY (MID/HI/LO) SETS }   { APPLICABLE FOR LAYOUTS WITH MAXIMUM OF 9 COLUMNS }

FIG. 13
CONFIGURATION: XIII

| | | | | | | | | | |
|---|---|---|---|---|---|---|---|---|---|
| HI (70%) | T | S | R | O | N | I | H | E | A | 9 COLUMNS |
| MID (25%) | Y | W | U | P | M | L | F | D | C | 9 COLUMNS |
| LO (5%) | Z | X | V | Q | K | J | G | B | | 8 COLUMNS |

LH (51%) ▲ RH (49%)

{ DESCENDING ALPHABET WITHIN FREQUENCY (HI/MID/LO) SETS }   { APPLICABLE FOR LAYOUTS WITH MAXIMUM OF 9 COLUMNS }

FIG. 14
CONFIGURATION: XIV

| | | | | | | | | | |
|---|---|---|---|---|---|---|---|---|---|
| 8 COLUMNS | | B | G | J | K | Q | V | X | Z | LO (5%) |
| 9 COLUMNS | A | E | H | I | N | O | R | S | T | HI (70%) |
| 9 COLUMNS | C | D | F | L | M | P | U | W | Y | MID (25%) |

LH (49%) ▲ RH (51%)

{ ASCENDING ALPHABET WITHIN FREQUENCY (LO/HI/MID) SETS }   { APPLICABLE FOR LAYOUTS WITH MAXIMUM OF 9 COLUMNS }

FIG. 15
CONFIGURATION: XV

| | | | | | | | | | |
|---|---|---|---|---|---|---|---|---|---|
| LO (5%) | Z | X | V | Q | K | J | G | B | | 8 COLUMNS |
| HI (70%) | T | S | R | O | N | I | H | E | A | 9 COLUMNS |
| MID (25%) | Y | W | U | P | M | L | F | D | C | 9 COLUMNS |

LH (51%) ▲ RH (49%)

{ DESCENDING ALPHABET WITHIN FREQUENCY (LO/HI/MID) SETS }   { APPLICABLE FOR LAYOUTS WITH MAXIMUM OF 9 COLUMNS }

FIG. 16
CONFIGURATION: XVI

| | | | | | | | | | |
|---|---|---|---|---|---|---|---|---|---|
| 9 COLUMNS | A | E | H | I | N | O | R | S | T | HI (70%) |
| 9 COLUMNS | C | D | F | L | M | P | U | W | Y | MID (25%) |
| 8 COLUMNS | | B | G | J | K | Q | V | X | Z | LO (5%) |

LH (49%) ▲ RH (51%)

{ ASCENDING ALPHABET WITHIN FREQUENCY (HI/MID/LO) SETS

{ APPLICABLE FOR LAYOUTS WITH MAXIMUM OF 9 COLUMNS

FIG. 17
CONFIGURATION: XXV

| MID (23%) | Y | W | U | P | M | L | G | F | C | B | 10 COLUMNS |
| HI (74%) | T | S | R | O | N | I | H | E | D | A | 10 COLUMNS |
| LO (3%) | Z | X | V | Q | K | J | | | | | 6 COLUMNS |

LH (51%) ▲ RH (49%)

{ DESCENDING ALPHABET WITHIN FREQUENCY (MID/HI/LO) SETS

{ APPLICABLE TO OVERLAY OF QWERTY LETTERS AND SEMICOLON COLON KEY

FIG. 18
CONFIGURATION: XXVI

| 6 COLUMNS | | | | | J | K | Q | V | X | Z | LO (3%) |
| 10 COLUMNS | A | D | E | H | I | N | O | R | S | T | HI (74%) |
| 10 COLUMNS | B | C | F | G | L | M | P | U | W | Y | MID (23%) |

LH (49%) ▲ RH (51%)

{ ASCENDING ALPHABET WITHIN FREQUENCY (LO/HI/MID) SETS

{ APPLICABLE TO OVERLAY OF TWO-HAND DVORAK LETTERS AND SEMICOLON COLON KEY

CONFIGURATION: XXVII

CONFIGURATION: XXVIII

CONFIGURATION: XXIX

FIG. 22

CONFIGURATION: XXX

| | | | | | | | | | |
|---|---|---|---|---|---|---|---|---|---|
10 COLUMNS | A | D | E | H | I | N | O | R | S | T | HI (74%)
10 COLUMNS | B | C | F | G | L | M | P | U | W | Y | MID (23%)
6 COLUMNS | | | | J | K | Q | V | X | Z | | LO (3%)

LH (49%) ▲ RH (51%)

{ ASCENDING ALPHABET WITHIN FREQUENCY (HI/MID/LO) SETS

{ APPROPRIATE FOR 10-COLUMN MAXIMUM

FIG. 23

CONFIGURATION: XXXI

LO (3%) | Z | X | V | Q | K | J | | | | | 6 COLUMNS
HI (74%) | T | S | R | O | N | I | H | E | D | A | 10 COLUMNS
MID (23%) | Y | W | U | P | M | L | G | F | C | B | 10 COLUMNS

LH (51%) ▲ RH (49%)

{ DESCENDING ALPHABET WITHIN FREQUENCY (LO/HI/MID) SETS

{ APPROPRIATE FOR 10-COLUMN MAXIMUM

FIG. 24

CONFIGURATION: XXXII

10 COLUMNS | B | C | F | G | L | M | P | U | W | Y | MID (23%)
10 COLUMNS | A | D | E | H | I | N | O | R | S | T | HI (74%)
6 COLUMNS | | | | J | K | Q | V | X | Z | | LO (3%)

LH (49%) ▲ RH (51%)

{ ASCENDING ALPHABET WITHIN FREQUENCY (MID/HI/LO) SETS

{ APPROPRIATE FOR 10-COLUMN MAXIMUM

CONFIGURATION: XXXVII

CONFIGURATION: XXXVIII

CONFIGURATION: XXXIX

FIG. 28
CONFIGURATION: XL

9 COLUMNS | Z X V Q P K J G B | LO (8%)
10 COLUMNS | Y W U S M L H F D C | MID (33%)
7 COLUMNS (INDENTED) | T R O N I E A | HI (59%)

LH (43%) ▲ RH (57%)

{ DESCENDING ALPHABET WITHIN FREQUENCY (LO/MID/HI) SETS

{ APPLICABLE TO 10-COLUMN MAXIMUM AND 13 LETTERS FOR EACH HAND

FIG. 29
CONFIGURATION: XLI

MID (33%) | C D F H L M S U W Y | 10 COLUMNS
HI (59%) | A E I N O R T | 7 COLUMNS (INDENTED)
LO (8%) | B G J K P Q V X Z | 9 COLUMNS

LH (57%) ▲ RH (43%)

{ ASCENDING ALPHABET WITHIN FREQUENCY (MID/HI/LO) SETS

{ APPLICABLE TO 10-COLUMN MAXIMUM AND 13 LETTERS FOR EACH HAND

FIG. 30
CONFIGURATION: XLII

10 COLUMNS | Y W U S M L H F D C | MID (33%)
7 COLUMNS (INDENTED) | T R O N I E A | HI (59%)
9 COLUMNS | Z X V Q P K J G B | LO (8%)

LH (43%) ▲ RH (57%)

{ DESCENDING ALPHABET WITHIN FREQUENCY (MID/HI/LO) SETS

{ APPLICABLE TO 10-COLUMN MAXIMUM AND 13 LETTERS FOR EACH HAND

FIG. 31
CONFIGURATION: XLIII

LO (8%) — B G J K P Q V X Z — 9 COLUMNS
HI (59%) — A E I N O R T — 7 COLUMNS (INDENTED)
MID (33%) — C D F H L M S U W Y — 10 COLUMNS

LH (57%) ▲ RH (43%)

{ ASCENDING ALPHABET WITHIN FREQUENCY (LO/HI/MID) SETS }

{ APPLICABLE TO 10-COLUMN MAXIMUM AND 13 LETTERS FOR EACH HAND }

FIG. 32
CONFIGURATION: XLIV

9 COLUMNS — Z X V Q P K J G B — LO (8%)
7 COLUMNS (INDENTED) — T R O N I E A — HI (59%)
10 COLUMNS — Y W U S M L H F D C — MID (33%)

LH (43%) ▲ RH (57%)

{ DESCENDING ALPHABET WITHIN FREQUENCY (LO/HI/MID) SETS }

{ APPLICABLE TO 10-COLUMN MAXIMUM AND 13 LETTERS FOR EACH HAND }

KEYBOARD CONFIGURATION SYSTEM

COPYRIGHT AUTHORIZATION

A portion of the disclosure of this patent document contains material which is subject to copyright protection. The copyright owner has no objection to the facsimile reproduction by any one of the patent disclosure as it appears in the U.S. Patent and Trademark Office patent files or records, but otherwise reserves all copyright rights whatsoever.

BACKGROUND OF THE INVENTION

1. Field of the Invention

This invention relates to keyboards such as used for typewriting and computer data entry and the like, and more particularly to a system for configuring a keyboard so that it is more easily learned and used by typists and users.

2. Description of the Related Art

With the advent of the typewriter, keyboards having keys corresponding to particular letters have been widely used for many years. Such keyboards are well established in the art.

Initially, typewriters often jammed because the keyboard used for the typewriters enabled the typist to go faster than the typewriter could type. This would cause the typewriter arms with the upraised letters to jam, causing the typewriting process to stop and forcing the typist to stop and clear the jam before proceeding.

This problem with initial keyboards or key sequences for typewriters was resolved by the implementation of the standard QWERTY keyboard. The QWERTY keyboard gets its name from the first six letters on the upper left hand side of the keyboard. The QWERTY keyboard was designed to actually slow the typist down so that the keys would not become jammed. Certain other accommodations or alignments may have taken place so that, for example, the two most frequently used keys would not cause each other to jam when typed in quick succession.

An alternative to the QWERTY keyboard is the DVORAK keyboard. The DVORAK keyboard is also well established and known in the art and was basically designed to provide a more ergonomic keyboard, placing the keys most used adjacent those fingers which are more able to use them. As people often use the letters E and T, these letters may be disposed adjacent the fingers that are more apt or able to use them.

Both of these keyboards suffer from the drawback that they are difficult to learn. They are difficult to learn conceptually because the keys are not disposed in any well-known organized sequence. They are also difficult to learn because the keys that are most used are not located in any regular location that easily conforms to a person's digital/finger anatomy or the mind's concept of the regular structure a keyboard often provides.

Many people may be hesitant to use a computer, typewriter, or other device due to the keyboard involved. Not knowing where the needed keys are leads to doubt that the proper key will be quickly found and fear that it will be a time-consuming process. Consequently, there may be some, if not many, individuals who consider a keyboard to be an imposition that is difficult to overcome due to its daunting nature and the fact that keyboard entry can be a slow and tedious process.

It would be an addition to the art to provide a means by which keyboards could be provided that are easy to use for beginners, but also allow established or experienced users to type quickly. The Keyboard Configuration System set forth herein satisfies both these criteria.

Some segment of the world's population has to perpetually learn or relearn the locations of keyboard letters. The existing QWERTY and the two-hand DVORAK keyboard layouts are well-known examples of keyboards used for typewriters, computers, and the like. These keyboard designs or structures may exclude that untutored population segment from knowledge-based society due to their design and complexity. Simplified layouts developed by the Keyboard Configuration System set forth herein serve as a means for inclusion of that population segment and make easier the learning and assimilation of such keyboards. The size of that population segment and the consequent future popularity of simplified keyboard layouts should not be underestimated. Furthermore, experienced typists can benefit from the System, as frequently used keys are readily available to the typist's fingertips.

SUMMARY OF THE INVENTION

In view of the foregoing disadvantages inherent in the known types of means by which keyboards can be configured, and now present in the prior art, the present invention provides a new keyboard configuration system wherein it can be used to efficiently and methodically provide a keyboard that is easier to use for both beginners and those who are familiar with the keyboard.

The general purpose of the present invention, as described below in greater detail, is to provide a keyboard configuration system by which alphabets of almost any, if not all, phonetic written languages can be applied to a keyboard structure in an efficient, predictable, and easy-to-learn manner. The Keyboard Configuration System set forth herein results in not only a new method by which keyboards can be achieved, but also new keyboards which are not anticipated, rendered obvious, suggested, taught, or even implied by any of the prior art keyboards or keyboard construction systems, either alone or taken in any reasonable combination thereof.

The Keyboard Configuration System set forth herein initially ranks the letters of the pertinent alphabet, for example the English alphabet, in the order in which the letter is most frequently used in the language. This is a ranking that is generally different from that of the alphabetical rank. For example, in the English language, the letters E and T are the most often used, while the letters A and B are the first letters in alphabetical sequence.

Once the frequency ranking is established, certain rules arc imposed as far as the keyboard is concerned. Generally, there are a limited number of rows for the keyboard, the number of rows generally being three. Additionally, there may be a limit to the length of a row, approximately ten. Additionally, a third rule can he applied in that the resulting key row sets are aligned at either their left side or their right side (left and right justification, respectively). Within these general operating parameters, the Keyboard Configuration System sets forth different rows comprising different frequency levels of the letters of the pertinent alphabet.

For a three row keyboard, a high frequency row, middle frequency row, and low frequency row are established to span and present the entire alphabet and are generally referred to herein as key row sets or key sets. The length of each of these rows may be different and may be shifted with respect to one another.

Prior to the association of individual frequency-ranked letters to keys on a keyboard, each of the selected row sets are placed in alphabetical order such that the high frequency, middle frequency, and low frequency key sets are all in alphabetical order from either left to right or right to left. The resulting alphabetized and frequency-biased key row sets are then applied to the keyboard in question.

Due to the variable number of keys in each row and the ability to shift key rows within the left or right limits of the longest key row, a variety of different keyboard configurations arise as candidates for a best or preferred keyboard or keyboards. For example, in the English language, 96 keyboard candidates arise for evaluation.

In order to evaluate such keyboard candidates, a demerit system is used. A demerit is assessed to the keyboard if there is backward travel from the alphabetical direction (left to right or right to left) going from the beginning of the alphabet to the end of the alphabet. Backward travel is considered to be backward when it either departs from such left to right or right to left travel. This generally means that, for example, if the alphabetical direction is left to right, in going from a letter to its next alphabetically-adjacent letter, the backward travel is in the right to left direction. A demerit is assessed for each column the next letter is physically away from the current letter. For example, in going from J to K, if the K key is three columns to the left of the J key and the alphabetical direction of travel is left to right, three demerits would be assessed to the keyboard.

Demerits are also assessed for excess forward travel. In the example above, one demerit only would be assessed for the K key if the K key were two columns to the right away from the J key. Alphabetical travel in the same column, or the next adjacent column in the alphabetical direction, is not assessed any demerits. In this way, forward travel is acknowledged, but excess forward travel is subject to a demerit for each column of excess forward travel experienced.

Once all of the keyboard candidates have been assessed for demerits, those with the fewest demerits are considered to be the best or preferred modes as they have been both frequency biased by the row selection and are more alphabetical in order than any of the other keyboards due to their minimal demerit tally.

The Keyboard Configuration System of the present invention results in keyboards that are easily used and understood, making them advantageous for both the experienced and novice user. While the English language has been used here as an example, any phonetically based language which has an alphabet (and apparently all such languages do) is susceptible to the Keyboard Configuration System set forth herein. Written language that is not based on phonetic alphabets, such as Asian languages, may be susceptible to the present System with minor changes, so long as there is a frequency-based discrimination that can be made as well as a standard linear progression for rearranging the frequency-biased rows. Other alphabets may also be susceptible to the present invention.

OBJECTS OF THE INVENTION

It is an object of the present invention to provide a system for obtaining keyboards that are efficient and useful.

It is another object of the present invention to provide a system to determine such keyboards that are reliable and predictable.

It is yet another object of the present invention to provide keyboards that are more useful as they are biased on both a frequency and alphabetical basis.

These and other objects and advantages of the present invention will be apparent from a review of the following specification and accompanying drawings. The foregoing objects are some of but a few of the goals attained by the present invention.

BRIEF DESCRIPTION OF THE DRAWINGS

FIGS. 1–8 are various arrangements of case 61, a particularly advantageous case as set forth herein.

FIGS. 9–16 show respectively eight configurations for cases 53 and 153 as set forth herein.

FIGS. 17–24 show respectively eight configurations for cases 196, 296, and 396 as set forth herein.

FIGS. 25–32 are eight configurations for the layout arising from case 317, a particularly advantageous case having a low number of demerits.

BRIEF DESCRIPTION OF THE APPENDICES

Figure 4:
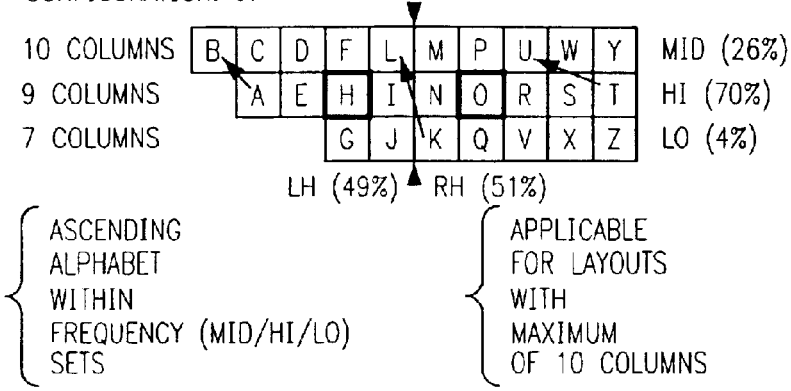

The following appendix is incorporated herein by this reference thereto.

The Appendix Index indicates the case numbers available by shift according to the key row sets used to obtain the alphabet string. The Appendix is a listing of the first 96 cases for a Gaines/Meaker letter frequency basis as well as additional cases of interest. Cases 101–196, 201–296, 301–396, and 401–496, are based upon other letter frequency determinations as indicated herein.

Certain case numbers are missing as redundant in that they are achieved by one of the first 96 cases (1–96) or otherwise. For example, cases 255–261 are missing as identical to cases 155–161. This is noted in case 254 with an indication of its being the same as case 154. As both cases 154 and 254 are identical, their shifts (shift 2–shift 8) are also identical. Consequently, cases 255–261 are identical to cases 155–161. More explanation is given in detail, below.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The Keyboard Configuration System is an iterative numerical process of both synthesis and evaluation that facilitates discovery of the most beneficial location of letters on keyboards. The Keyboard Configuration System may result in a keyboard that is in both alphabetical and frequency-of-use ("frequency") order. Generally, this location of letters follows the alphabet for the language in question. For English, it is seen as beneficial to have the letters on the keyboard in alphabetical, A–Z, order.

The System uses the same alphabetical collating sequences that index dictionaries. The System is adaptable to all alphabets and to almost all written languages. Letters may be converted for convenience to numerical equivalents beginning with 01 for the first letter. The System uses available percentages indicating frequency of occurrence by letter in the relevant language. Percentages may be converted for convenience to numerical rankings beginning with number 01 for the most used letter.

Each letter may be linked or associated to both a numerical equivalent and a numerical ranking. All of the numerical rankings are then rearranged from 01 and up. The numerical rankings are then subdivided into several sets that reflect major categories varying from highest to lowest frequencies. The minimum quantity of sets is governed by the actual or planned count of keyboard rows in a field of keyboard letters. Typically, three keyboard rows are used leading to three sets. The quantity of numerical rankings in a set is governed by the actual or planned counts of columns per row in a field of keyboard letters. The quantity of sets may be increased by variations in the counts of columns per row, across all rows. Planned variations could be essential to finding suitable or "best" alternative keyboard layouts.

Once a keyboard row set is established, the numerical rankings by frequency may be ignored, and the focus may be on the numerical equivalents of the letters. These numerical equivalents are then rearranged from 01 and up (that is, ascending or descending alphabetical order) within each keyboard row set. The same numerical equivalent values may reappear in several sets. Analysis is performed individually on strings of sets with each string accounting for each letter once and only once.

Evaluation is performed as if all sets within a string were positioned side by side. Tallies of demerits may be accumulated during evaluation when the numerical equivalent of a letter is incremented by 01 and the result is necessarily found in one of the sets (rows) within a string. Demerits are counted for every position, in a column wise (or horizontal) sense, of movement that retreats from the nominal forward direction, generally considered as one column forward of the currently selected key. Demerits are also counted for every position (column) of movement that advances in the nominal forward direction that is in excess of 01 position (column) of change.

The system may cycle at least once for each string, and the two different demerit tallies (backward-type demerits and excess-forward type demerits) are reported for each string. Additional cycling is needed if there are variations in set lengths (columns per row) within a string. For example, a set length of nine has two degrees of freedom with respect to a set length limit of 10 within a string, as there are two ways a nine key set can be disposed within a 10 key row. A set length of seven would then have four degrees of freedom.

Planned displacements beyond the boundaries of maximum set length for a string could also be essential or useful to finding suitable alternative keyboard layouts.

The following case study illustrates an exemplary application of the Keyboard Configuration System to the English language and alphabet commonly used in the United States. The tables set forth herein track this alphabet through all the steps of the System. Specific keyboard configurations are developed by the process. The overall visual effect from new configurations is that of a braided alphabet, achieved by interlacing letters from all rows within an optimized column-by-column progression.

Table 1 is established by creating 26 records. The key value in each record is called the "numerical equivalent." These values are integers varying from 01 through 26. One "letter" of the alphabet is assigned to each of the 26 records. The alphabet letters are: A, B, C, D, E, F, G, H, I, J, K, L, M, N, O, P, Q, R, S, T, U, V, W, X, Y, Z. This alphabetical sequence is used to assign the letters, starting with letter A and numerical equivalent 01. The last letter Z is paired with numerical equivalent 26. The assigned letters are then used as a link in establishing "ranking" values in all 26 records. Consequently, this part of the process ranks the letters according to alphabetical order. By using sets indicating alphabetical order, the System is more easily generalized to other alphabets.

TABLE 1

Arranged by Numerical Equivalent

| LETTER | ALPHABETICAL NUMERICAL EQUIVALENT | FREQUENCY RANKING |
| --- | --- | --- |
| A | 01 | 03 |
| B | 02 | 19 |
| C | 03 | 12 |
| D | 04 | 11 |
| E | 05 | 01 |
| F | 06 | 15 |
| G | 07 | 20 |
| H | 08 | 09 |
| I | 09 | 06 |
| J | 10 | 25 |
| K | 11 | 22 |
| L | 12 | 10 |
| M | 13 | 16 |
| N | 14 | 05 |
| O | 15 | 04 |
| P | 16 | 14 |
| Q | 17 | 23 |
| R | 18 | 08 |
| S | 19 | 07 |
| T | 20 | 02 |
| U | 21 | 13 |
| V | 22 | 21 |
| W | 23 | 17 |
| X | 24 | 24 |
| Y | 25 | 18 |
| Z | 26 | 26 |

The Keyboard Configuration System also requires the letters to be ranked in terms of frequency of use in the relevant language. This is a statistical evaluation as reflected generally by the actual use of the language.

The book *Cryptanalysis* by H. F. Gaines lists one order and frequency of single letters. This list was compiled from a chart showing frequencies of English diagrams, prepared by G. P. Meaker. This chart sums the actual count made on 10,000 letters of literary text. These sums by letter are easily converted to percentages by inserting a decimal point. The letters were placed in order by sorting on the frequency (percentage) values with the following result:

| | |
| --- | --- |
| Z and 0.09% | J and 0.10% |
| X and 0.20% | Q and 0.20% |
| K and 0.52% | V and 0.93% |
| G and 1.61% | B and 1.62% |
| Y and 1.88% | W and 2.03% |
| M and 2.25% | F and 2.28% |
| P and 2.29% | U and 3.10% |
| C and 3.20% | D and 3.65% |
| L and 4.03% | H and 5.14% |
| R and 6.03% | S and 6.59% |
| I and 7.18% | N and 7.19% |
| O and 7.94% | A and 8.05% |
| T and 9.59% | E and 12.31% |

The frequency ranking values in Table 1 are integers varying from 26 through 01. The frequency (percentage)

order is used to assign the rankings, starting with letter Z and ranking 26, then letter J and ranking 25. The next to last letter T is paired with ranking 02, then letter E is paired with ranking 01. This concludes the loading of both alphabetical and frequency ranking values into Table 1 (arranged by numerical equivalents).

Table 2 (rearranged by numerical ranking) is achieved by sorting Table 1 on the frequency ranking values in ascending order. The key value in each record is now its "numerical ranking." These values are integers varying from 01 through 26 with one number uniquely corresponding to each letter of the relevant alphabet. Finally, Table 2 is verified by matching the displayed letters against the frequency order: E, T, A, O, N, I, S, R, H, L, D, C, U, P, F, M, W, Y, B, G, V, K, Q, X, J, Z. (from Gaines/Meaker)

TABLE 2

Arranged by Numerical Ranking

| LETTER | ALPHABETICAL NUMERICAL EQUIVALENT | FREQUENCY RANKING |
|---|---|---|
| E | 05 | 01 |
| T | 20 | 02 |
| A | 01 | 03 |
| O | 15 | 04 |
| N | 14 | 05 |
| I | 09 | 06 |
| S | 19 | 07 |
| R | 18 | 08 |
| H | 08 | 09 |
| L | 12 | 10 |
| D | 04 | 11 |
| C | 03 | 12 |
| U | 21 | 13 |
| P | 16 | 14 |
| F | 06 | 15 |
| M | 13 | 16 |
| W | 23 | 17 |
| Y | 25 | 18 |
| B | 02 | 19 |
| G | 07 | 20 |
| V | 22 | 21 |
| K | 11 | 22 |
| Q | 17 | 23 |
| X | 24 | 24 |
| J | 10 | 25 |
| Z | 26 | 26 |

The 25 key row sets are set forth in Table 3 where the sets are arranged by ranking range. The sets have a hyphenated key that is the ranking range with a key frequency ranking start value followed by a key frequency ranking end value. Each row set has a set length value for the number of keys in the row, which is also one greater than the difference calculated by subtracting ranking start value from ranking end value. The minimum set length is determined by imposing the arbitrary condition that there are three rows of letters (three sets) and a maximum of 10 columns of letters in a row on the keyboard. If two rows have 10 columns each, then the third row has six columns so that the total is 26 letters (the number of letters in the presently-selected alphabet). Therefore, the set lengths in Table 3 are either 06, 07, 08, 09 or 10, and the possible groupings are then limited to rows having at least six keys, but no more than ten keys.

TABLE 3

Sets by Ranking Range

| RANKING RANGE | SET LENGTH | NUMERICAL EQUIVALENTS |
|---|---|---|
| 01–06 | 06 | 05, 20, 01, 15, 14, 09 |
| 01–07 | 07 | 05, 20, 01, 15, 14, 09, 19 |
| 01–08 | 08 | 05, 20, 01, 15, 14, 09, 19, 18 |
| 01–09 | 09 | 05, 20, 01, 15, 14, 09, 19, 18, 08 |
| 01–10 | 10 | 05, 20, 01, 15, 14, 09, 19, 18, 08, 12 |
| 07–16 | 10 | 19, 18, 08, 12, 04, 03, 21, 16, 06, 13 |
| 08–16 | 09 | 18, 08, 12, 04, 03, 21, 16, 06, 13 |
| 08–17 | 10 | 18, 08, 12, 04, 03, 21, 16, 06, 13, 23 |
| 09–16 | 08 | 08, 12, 04, 03, 21, 16, 06, 13 |
| 09–17 | 09 | 08, 12, 04, 03, 21, 16, 06, 13, 23 |
| 09–18 | 10 | 08, 12, 04, 03, 21, 16, 06, 13, 23, 25 |
| 10–16 | 07 | 12, 04, 03, 21, 16, 06, 13 |
| 10–17 | 08 | 12, 04, 03, 21, 16, 06, 13, 23 |
| 10–18 | 09 | 12, 04, 03, 21, 16, 06, 13, 23, 25 |
| 10–19 | 10 | 12, 04, 03, 21, 16, 06, 13, 23, 25, 02 |
| 11–16 | 06 | 04, 03, 21, 16, 06, 13 |
| 11–17 | 07 | 04, 03, 21, 16, 06, 13, 23 |
| 11–18 | 08 | 04, 03, 21, 16, 06, 13, 23, 25 |
| 11–19 | 09 | 04, 03, 21, 16, 06, 13, 23, 25, 02 |
| 11–20 | 10 | 04, 03, 21, 16, 06, 13, 23, 25, 02, 07 |
| 17–26 | 10 | 23, 25, 02, 07, 22, 11, 17, 24, 10, 26 |
| 18–26 | 09 | 25, 02, 07, 22, 11, 17, 24, 10, 26 |
| 19–26 | 08 | 02, 07, 22, 11, 17, 24, 10, 26 |
| 20–26 | 07 | 07, 22, 11, 17, 24, 10, 26 |
| 21–26 | 06 | 22, 11, 17, 24, 10, 26 |

The first group of key row sets ("sets") has a frequency ranking start value 01 and set lengths 06, 07, 08, 09 and 10. The second group has a frequency ranking start value 07 (as the first group has at least six letters) and set length 10 (the maximum). No other sets are needed for the second group as a smaller set would require a third group having more than ten letters, the limit in this example. The third group has ranking start value 08 and set lengths 09 and 10. The fourth group has ranking start value 09 and set lengths 08, 09 and 10. The fifth group has ranking start value 10 and set lengths 07, 08, 09 and 10. The sixth group has ranking start value 11 and set lengths 06, 07, 08, 09 and 10. The seventh group of sets has ranking end value 26 and set lengths 10, 09, 08, 07 and 06.

Each set in Table 3 has room for up to 10 numerical equivalent values, or key frequency numerical equivalent values. The set length value controls the actual number of numerical equivalent values in each record. These numerical equivalent values are fetched from Table 2, as follows. The first ranking range 01–06, for example, isolates the first six sets in Table 2 and numerical equivalent values 05, 20, 01, 15, 14 and 09 are transferred. This process is repeated until all 25 sets are prepared. However, the last ranking range 21–26, for example, isolates the last six sets, or letters, in Table 2, and numerical equivalent values 22, 11, 17, 24, 10 and 26 are transferred. The same is similarly true for the other four sets ending with "Z", numerical equivalent 26.

Table 4 (rearranged equivalents by set) is very similar to Table 3. The total number of sets is also 25. The key ranking range values are identical, as are the set length values. The only difference is the horizontal order of the numerical equivalent values. The horizontal order is changed from ascending frequency ranking to ascending alphabetical ranking. Each of the 25 sets is manipulated independently, as follows. The first record places values 01, 05, 09, 14, 15 and 20 in alphabetical ascending sequence. This process is repeated until all 25 sets are prepared. The last set places values 10, 11, 17, 22, 24 and 26 in alphabetically ascending sequence, for example.

TABLE 4

Alphabetically Rearranged Equivalents by Set

| RANKING RANGE | SET LENGTH | ALPHABETIZED NUMERICAL EQUIVALENTS |
|---|---|---|
| 01–06 | 06 | 01, 05, 09, 14, 15, 20 |
| 01–07 | 07 | 01, 05, 09, 14, 15, 19, 20 |
| 01–08 | 08 | 01, 05, 09, 14, 15, 18, 19, 20 |
| 01–09 | 09 | 01, 05, 08, 09, 14, 15, 18, 19, 20 |
| 01–10 | 10 | 01, 05, 08, 09, 12, 14, 15, 18, 19, 20 |
| 07–16 | 10 | 03, 04, 06, 08, 12, 13, 16, 18, 19, 21 |
| 08–16 | 09 | 03, 04, 06, 08, 12, 13, 16, 18, 21 |
| 08–17 | 10 | 03, 04, 06, 08, 12, 13, 16, 18, 21, 23 |
| 09–16 | 08 | 03, 04, 06, 08, 12, 13, 16, 21 |
| 09–17 | 09 | 03, 04, 06, 08, 12, 13, 16, 21, 23 |
| 09–18 | 10 | 03, 04, 06, 08, 12, 13, 16, 21, 23, 25 |
| 10–16 | 07 | 03, 04, 06, 12, 13, 16, 21 |
| 10–17 | 08 | 03, 04, 06, 12, 13, 16, 21, 23 |
| 10–18 | 09 | 03, 04, 06, 12, 13, 16, 21, 23, 25 |
| 10–19 | 10 | 02, 03, 04, 06, 12, 13, 16, 21, 23, 25 |
| 11–16 | 06 | 03, 04, 06, 13, 16, 21 |
| 11–17 | 07 | 03, 04, 06, 13, 16, 21, 23 |
| 11–18 | 08 | 03, 04, 06, 13, 16, 21, 23, 25 |
| 11–19 | 09 | 02, 03, 04, 06, 13, 16, 21, 23, 25 |
| 11–20 | 10 | 02, 03, 04, 06, 07, 13, 16, 21, 23, 25 |
| 17–26 | 10 | 02, 07, 10, 11, 17, 22, 23, 24, 25, 26 |
| 18–26 | 09 | 02, 07, 10, 11, 17, 22, 24, 25, 26 |
| 19–26 | 08 | 02, 07, 10, 11, 17, 22, 24, 26 |
| 20–26 | 07 | 07, 10, 11, 17, 22, 24, 26 |
| 21–26 | 06 | 10, 11, 17, 22, 24, 26 |

The five sets in Table 4 with ranking start value 01 identify those letters with high frequency of usage. The five sets with ranking end value 26 identify those letters with low frequency of usage. It appears to be mere coincidence that the last letter in the alphabet is also used least. The 15 remaining sets identify those letters with frequency of usage that is not high and not low.

The ranking range of each of the 15 middle frequency sets generally govern the construction of ranking range strings making up an entire and restructured alphabet. Each string is composed of key row sets that are selected or configured to provide each letter in the selected alphabet. As used herein, the term "string" generally refers to such a reconfigured alphabet or keyboard sequence made up of appropriately selected key sets.

Each middle ranking range is preceded by a high-ranking range and followed by a low ranking range. The high and low ranking ranges are selected appropriately so that the numerical equivalents of the selected alphabet's 26 letters are used once and only once per string. The 15 strings (that are the 15 middle ranking ranges) are summarized in an Appendix Index, which immediately precedes the Appendix of case studies set forth herewith. Each of these 15 key/letter strings is associated with a specific count, or number, of cases. Three of the 15 strings (9–17; 10–17; 10–18) use two cases per string for a subtotal of six cases. Three of the 15 strings (7–16; 11–16; 11–20) use five cases of a keyboard layout per string for a subtotal of 15 cases. Six strings (8–16; 8–17; 10–16; 10–19; 11–17; 11–19) use eight cases per string for a subtotal of 48 cases. Finally, three strings (9–16; 9–18; 11–18) use nine cases per string for a subtotal of 27 cases. In some cases, the additional requirement of left side or right side alignment is also imposed (e.g., cases 31 and 32).

The lowest case number associated with each string correlates with either shift 1 of 2, shift 1 of 5, shift 1 of 8 or shift 1 of 9, respectively. The highest case number associated with each string correlates with either shift 2 of 2, shift 5 of 5, shift 8 of 8 or shift 9 of 9, respectively. The number of shifts per string is a function of the degrees of freedom afforded short set lengths with respect to the maximum set length for each string. Generally, the longest set in a string defines the left and right boundaries for justification purposes.

The two case numbers 31 and 32 illustrate alignments for a combination of set lengths 8, 9, and 9. The three ranking ranges of the strings are separately used to access Table 4, and the numerical equivalent values are transferred to three lists in all two case exhibits.

In this case, the key strings are of length 8, 9, and 9, which result in three sets of ranking ranges. Set 1 is 01–08, 09–17, and 18–26, which begins with case 31. Set 2 is 01–09, 10–17, and 18–26, which begins with case 50. Set 3 is 01–09, 10–18, and 19–26, which begins with case 52. These three sets correspond respectively to key set lengths of 8, 9, 9; 9, 8, 9; and 9, 9, 8, respectively, and are the three permutations of key string lengths 8, 9, 9 for the ranking ranges available in Table 4 that cover the entire 26 letter English alphabet.

In case 31, shift 1 of 2 initializes all lists in position 01. In case 32, shift 2 of 2 starts the short list in position 02. Both lists end in position 09.

The five case numbers 01 through 05 illustrate alignments for a combination of set lengths 6, 10, and 10. The unique three ranking ranges of the string are separately used to access, or are used in reference to, Table 4, and the numerical equivalent values are used as the key sets in all five case exhibits. Shift 1 of 5 initializes all lists in position 01. Shifts 2 of 5, 3 of 5, and 4 of 5 start the short list in positions 02, 03 and 04, respectively. Shift 5 of 5 starts the short list in position 05, and all lists end in position 10. There are five shifts, or degrees of freedom, available for a 26-letter keyboard with set lengths of 6, 10, and 10 as there are five different positionings for the six-key string with respect to the other two ten-key strings. For efficiency and convenience, the two ten-key strings are configured with their ends aligned.

The eight case numbers 06 through 13 illustrate alignments for a combination of set lengths 7, 9, and 10. The eight case numbers arise from the four positions available for the seven-key string times the two positions available for the nine-key string. The three key set ranking ranges of the string are separately used to access Table 4, and the numerical equivalent values are used in the three key sets in all eight case exhibits. Shift 1 of 8 initializes all lists in position 01. Shifts 2 of 8, 3 of 8 and 4 of 8 start the shortest list, the seven-key string, in positions 02, 03 and 04, respectively. Shift 5 of 8 restarts the shortest list in position 01 and starts the other short list, the nine-key string, in position 02. Shifts 6 of 8 and 7 of 8 restart the shortest list in positions 02 and 03, respectively. Shift 8 of 8 restarts the shortest list in position 04, and all lists end in position 10.

The nine case numbers 22 through 30 illustrate alignments for a combination of set lengths 8, 8, and 10. The three ranking ranges of the string are separately used to access Table 4, and the numerical equivalent values are used in the three key set lists in all nine case exhibits. Shift 1 of 9 initializes all lists in position 01. Shifts 2 of 9 and 3 of 9 start one chosen short list in positions 02 and 03, respectively. Shift 4 of 9 restarts the chosen short list in position 01 and starts the other short list in position 02. Shifts 5 of 9 and 6 of 9 restart the chosen short list in positions 02 and 03, respectively. Shift 7 of 9 restarts the chosen short list in position 01 and starts the other short list in position 03. Shift 8 of 9 restarts the chosen short list in position 02. Shift 9 of 9 restarts the chosen short list in position 03, and all lists end in position 10.

Similarly, the process is repeated for the remaining cases, cases 31–96, for set lengths 8, 9, 9 (2 cases); 8, 10, 8 (9 cases); 9, 7, 10 (8 cases); 9, 8, 9 (2 cases); 9, 9, 8 10, 7 (8 cases); 10, 6, 10 (5 cases); 10, 7, 9 (8 cases); 10, 8, 8, (9 cases); 10, 9, 7 (8 cases); and 10, 10, 6 (5 cases). All of these cases, as indicated above, are generated from Table 4 with the construction rule that that no key string has greater than ten keys and that the entire (26 letter English) alphabet is covered.

Case number 92 is the least optimized of the 96 cases. Evaluation is performed on 25 pairs of successive numerical equivalent values, which results in a gauge of the case's optimization or lack thereof. Demerit scores are displayed in the case exhibit next to the higher of successive values for a pair. In case number 92, the pairs 01 to 02 (A to B), 13 to 14 (M to N), and 15 to 16 (O to P) receive no demerits for lateral movement in the same position. The pairs 02 to 03 (B to C), 03 to 04 (C to D), 06 to 07 (F to G), 08 to 09 (H to I), 10 to 11 (J to K), 12 to 13 (L to M), 14 to 15 (N to O), 18 to 19 (R to S), and 19 to 20 (S to T) receive no demerits for forward movement of one position. The pair 04 to 05 (D to E) receives one demerit for backward movement of one position. The pairs 07 to 08 (G to H) and 20 to 21 (T to U) receive two demerits for backward movement of two positions. The pair 09 to 10 (I to J) receives three demerits for backward movement of three positions. The pairs 16 to 17 (P to Q), 21 to 22 (U to V), 23 to 24 (W to X), and 25 to 26 (Y to Z) receive four demerits for backward movement of four positions. There are a total of 24 demerits for backward movement for the entire case of case number 92.

The pair 05 to 06 (E to F) receives one demerit for forward movement of two positions (one column excess forward). The pair 11 to 12 (K to L) receives two demerits for forward movement of three positions. The pairs 17 to 18 (Q to R), 22 to 23 (V to W), and 24 to 25 (X to Y) receive four demerits for forward movement of five positions. There are a total of 15 demerits for excess forward movement.

As indicated above, demerits are given for any backward motion or any excess forward motion that is two or more columns away from the first key. No demerits are given for forward motion of one column from the first key or motion in the same column as the first key.

Case numbers 53 and 61 are tied for the most optimized of the 96 cases. Each case has no demerits for excess forward movement. Each case has a total of four demerits for backward movement. In both cases, the pair 20 to 21 receives two demerits for backward movement. In both cases, the pair 11 to 12 receives one demerit for backward movement. In case 53 all lists end in position 09, and the pair 02 to 03 receives one demerit for backward movement. In case 61 all lists end in position 10, and the pair 01 to 02 receives one demerit for backward movement.

Table 5 (case numbers by total demerits) has a one line record for each of the 96 cases. Backward demerits and excess forward demerits are displayed. These two demerit values are summed, and the total demerits result is displayed for each case. All 96 sets in Table 5 are sorted by case number within total demerits value. Case number 92 is listed at the end of Table 5. The largest total demerits value of 39 is the sum of 24 backward demerits and 15 excess forward demerits. Only three cases have no excess forward demerits. Case numbers 53, 61 and 40 are listed in that sequence at the beginning of Table 5. Case number 40 is not the most optimized, because five backward demerits were contributed by four pairs of numerical equivalent values. Both case numbers 53 and 61 are the most optimized, because in each case four backward demerits were contributed by only three pairs of numerical equivalent values. For these three leading cases, the total demerits equal backward demerits.

TABLE 5

Case Numbers by Total Demerits

| TOTAL DEMERITS | CASE NUMBER | BACKWARD DEMERITS | EXCESS FORWARD DEMERITS |
|---|---|---|---|
| 4 | 53 | 4 | 0 |
| 4 | 61 | 4 | 0 |
| 5 | 40 | 5 | 0 |
| 6 | 57 | 5 | 1 |
| 7 | 41 | 6 | 1 |
| 7 | 42 | 6 | 1 |
| 7 | 96 | 6 | 1 |
| 8 | 72 | 6 | 2 |
| 8 | 79 | 6 | 2 |
| 8 | 86 | 6 | 2 |
| 8 | 87 | 7 | 1 |
| 9 | 50 | 7 | 2 |
| 9 | 91 | 7 | 2 |
| 10 | 22 | 8 | 2 |
| 10 | 39 | 7 | 3 |
| 10 | 71 | 8 | 2 |
| 10 | 76 | 8 | 2 |
| 10 | 80 | 8 | 2 |
| 10 | 83 | 7 | 3 |
| 11 | 19 | 8 | 3 |
| 11 | 25 | 9 | 2 |
| 11 | 36 | 8 | 3 |
| 11 | 52 | 8 | 3 |
| 11 | 56 | 8 | 3 |
| 12 | 43 | 10 | 2 |
| 12 | 60 | 9 | 3 |
| 12 | 62 | 9 | 3 |
| 12 | 67 | 9 | 3 |
| 12 | 75 | 9 | 3 |
| 13 | 07 | 10 | 3 |
| 13 | 20 | 9 | 4 |
| 13 | 46 | 10 | 3 |
| 13 | 63 | 10 | 3 |
| 13 | 73 | 9 | 4 |
| 13 | 95 | 9 | 4 |
| 14 | 31 | 10 | 4 |
| 14 | 38 | 10 | 4 |
| 14 | 47 | 11 | 3 |
| 15 | 08 | 11 | 4 |
| 15 | 32 | 11 | 4 |
| 15 | 68 | 11 | 4 |
| 15 | 82 | 10 | 5 |
| 15 | 90 | 10 | 5 |
| 16 | 06 | 11 | 5 |
| 16 | 18 | 11 | 5 |
| 16 | 28 | 12 | 4 |
| 16 | 51 | 12 | 4 |
| 17 | 02 | 12 | 5 |
| 17 | 64 | 12 | 5 |
| 17 | 78 | 12 | 5 |
| 17 | 85 | 12 | 5 |
| 18 | 03 | 13 | 5 |
| 18 | 26 | 13 | 5 |
| 18 | 33 | 12 | 6 |
| 19 | 15 | 13 | 6 |
| 19 | 29 | 14 | 5 |
| 19 | 34 | 13 | 6 |
| 19 | 77 | 13 | 6 |
| 20 | 01 | 13 | 7 |
| 20 | 21 | 14 | 6 |
| 20 | 23 | 14 | 6 |
| 20 | 44 | 14 | 6 |
| 20 | 55 | 14 | 6 |
| 21 | 12 | 15 | 6 |
| 21 | 16 | 14 | 7 |

TABLE 5-continued

Case Numbers by Total Demerits

| TOTAL DEMERITS | CASE NUMBER | BACKWARD DEMERITS | EXCESS FORWARD DEMERITS |
|---|---|---|---|
| 21 | 48 | 15 | 6 |
| 21 | 69 | 14 | 7 |
| 21 | 94 | 14 | 7 |
| 22 | 04 | 16 | 6 |
| 22 | 09 | 16 | 6 |
| 22 | 14 | 14 | 8 |
| 22 | 59 | 15 | 7 |
| 22 | 74 | 14 | 8 |
| 23 | 13 | 16 | 7 |
| 24 | 11 | 16 | 8 |
| 24 | 35 | 16 | 8 |
| 24 | 65 | 16 | 8 |
| 24 | 89 | 16 | 8 |
| 25 | 81 | 16 | 9 |
| 27 | 30 | 18 | 9 |
| 28 | 17 | 19 | 9 |
| 28 | 84 | 18 | 10 |
| 29 | 05 | 20 | 9 |
| 29 | 10 | 18 | 11 |
| 29 | 27 | 19 | 10 |
| 29 | 45 | 19 | 10 |
| 29 | 49 | 19 | 10 |
| 30 | 70 | 19 | 11 |
| 30 | 93 | 19 | 11 |
| 31 | 54 | 20 | 11 |
| 32 | 24 | 20 | 12 |
| 32 | 66 | 20 | 12 |
| 33 | 58 | 21 | 12 |
| 35 | 88 | 22 | 13 |
| 39 | 92 | 24 | 15 |

The two most optimized cases (53 and 61) are consolidated in Table 6 (the numerical equivalent solutions normalized, or rearranged, for comparison). The three key set lists (high, middle, and low ranking rows) of numerical equivalents in each case are inverted so that the greatest value in each list is relocated to the top. The relocations are identical for numerical equivalents 01 (A) and the entire sequence from 03 through 26 (C–Z). The sole exception is numerical equivalent 02 (B), which is depicted in two locations. Parentheses are used to suggest that both locations do not occur simultaneously. In the 10-column solution (case 61), value 02 is at the bottom of the list for the middle ranking row. In the 9-column solution (case 53), value 02 is at the bottom of the list for the low ranking row. The high-ranking row remains constant for both 10-column and 9-column solutions.

TABLE 6

Numerical Equivalent Solutions Normalized for Comparison
Cases 53 (9-column) and 61 (10-column)

| COLUMN | HIGH RANKING ROW | MIDDLE RANKING ROW | LOW RANKING ROW |
|---|---|---|---|
| 01 | 20 | 25 | 26 |
| 02 | 19 | 23 | 24 |
| 03 | 18 | 21 | 22 |
| 04 | 15 | 16 | 17 |
| 05 | 14 | 13 | 11 |
| 06 | 09 | 12 | 10 |
| 07 | 08 | 06 | 07 |
| 08 | 05 | 04 | (02) |
| 09 | 01 | 03 | |
| 10 | | (02) | |

The basic pattern of the twin solutions in Table 6 can be manipulated into a variety of keyboard layouts. Table 7 (24 configurations defined by two solutions) sets forth the variables that contribute to configurations. The location of numerical equivalent 02 (Letter B) determines maximum 10-letter or 9-letter rows for this configuration. The left-to-right sequence of descending alphabet (from Z to A) locates numerical equivalents 20, 25 and 26 (letters T, Y and Z) in a left side column justification. Ascending alphabet (from A to Z) locates letters T, Y and Z in a right side column justification.

TABLE 7

Cases 53 and 61
24 Configurations Defined by 2 Solutions

| NUMBER OF CONFIGURATIONS | OPTIONS |
|---|---|
| 6 | High/Middle/Low Frequency Sets versus Top/Center/Bottom Rows |
| 2 | Left Side Column Justification versus Right Side Column Justification |
| 2 | Maximum 10-Letter Row Solution versus Maximum 9-Letter Row Solution |
| 24 | Multiplication Product |

The high, middle and low frequency sets of letters are independently located on top, center or bottom rows of keys. When the high and middle frequency sets are not separated, there are four ways to locate sets on rows; the low frequency set is on the top or bottom row, and the high frequency set is directly above or directly below the middle frequency set. When the high and middle frequency sets are separated, there are two ways to locate-sets on rows; the low frequency set is on the center row, and the high frequency set is two rows above or two rows below the middle frequency set. The 24 configurations covered by this application are defined by exploring all of the possible outcomes of each of the three types of variables noted in Table 7.

Several examples of realized keyboards using configurations/Cases 53 and 61 are shown in FIGS. 1–16. FIGS. 1–8 correspond to case 61 and FIGS. 9–16 correspond to case 53.

Figure 33:
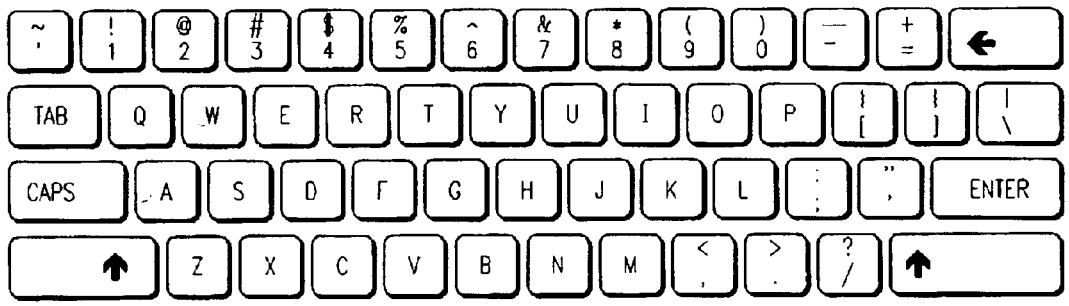
FIGS. 33 and 34 are keyboard layouts for the QWERTY keyboard and the DVORAK keyboard, respectively, both keyboard layouts previously known in the art.
Figure 34:
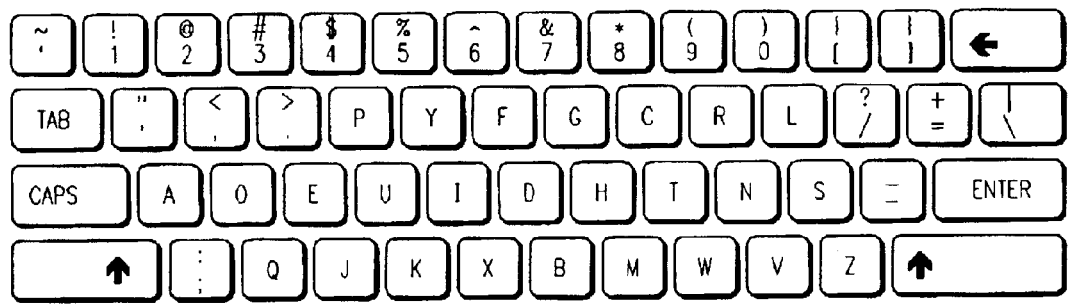

The achieved improvements of the Keyboard Configuration System are compared to two popular examples of prior art: the QWERTY layout (FIG. 33) and the two-hand DVORAK layout (FIG. 34). Table 8 (competitive activity metrics) quantifies three categories of activity: demerits evaluated by the case method, percentages per row by frequency, percentages per hand. The displayed percents are rounded to integers.

The excess forward demerits and backward demerits for the Keyboard Configuration System are taken directly from the leading sets of Table 5, which are, as indicated above, cases 53 and 61. Corresponding values for the QWERTY layout are developed as follows: The pairs C to D, D to E and W to X receive no demerits for lateral movement. The pairs E to F, F to G, G to H, J to K, K to L and O to P receive no demerits for forward movement of one position. The pairs H to I and T to U receive one demerit for excess forward movement of two positions. The pairs N to O, Q to R and S to T receive two demerits for excess forward movement of three positions. The pairs A to B and X to Y receive three demerits for excess forward movement of four positions. There are a total of 14 demerits for excess forward movement. The pairs I to J and M to N receive one demerit for backward movement. The pairs B to C, L to M, R to S and V to W receive two demerits for backward movement. The pair U to V receives three demerits for backward movement.

The pair Y to Z receives five demerits for backward movement. The pair P to Q receives nine demerits for backward movement. There are a total of 27 demerits for backward movement. There are a grand total of 41 demerits for the QWERTY layout.

Corresponding values for the two-hand DVORAK layout are developed as follows: The pairs G to H and X to Y receive no demerits for lateral movement. The pairs F to G, J to K and R to S receive no demerits for forward movement of one position. The pairs B to C, M to N and O to P receives one demerit for excess forward movement of two positions. The pair E to F receives two demerits for excess forward movement of three positions. The pairs A to B, U to V and Y to Z receive four demerits for excess forward movement of five positions. The pair K to L receives five demerits for excess forward movement of six positions. The pair Q to R receives six demerits for excess forward movement of seven positions. There are a total of 28 demerits for excess forward movement. The pair V to W receives one demerit for backward movement. The pairs C to D, H to I, I to J, P to Q and S to T receive two demerits for backward movement. The pairs D to E, L to M and W to X receive three demerits for backward movement. The pair T to U receives four demerits for backward movement. The pair N to O receives seven demerits for backward movement. There are a total of 31 demerits for backward movement. There are a grand total of 59 demerits for the two-hand DVORAK layout.

All three competing layouts have 11 letter keys operated by one hand and 15 letter keys operated by the other hand. The maximum 10-letter row layout of the Keyboard Configuration System Case 61 has six component frequency percentages (the percent frequency of use for letter) as follows. The high frequency row of the 11-letter side contains A and 8.05%, E and 12.31%, H and 5.14%, I and 7.18% for a subtotal of 32.68%. The middle frequency row of the 11-letter side contains B and 1.62%, C and 3.20%, D and 3.65%, F and 2.28%, L and 4.03% for a subtotal of 14.78%. The low frequency row of the 11-letter side contains G and 1.61%, J and 0.10% for a subtotal of 1.71%. The high frequency row of the 15-letter side contains N and 7.19%, O and 7.94%, R and 6.03%, S and 6.59%, T and 9.59% for a subtotal of 37.34%. The middle frequency row of the 15-letter side contains M and 2.25%, P and 2.29%, U and 3.10%, W and 2.03%, Y and 1.88% for a subtotal of 11.55%. The low frequency row of the 15-letter side contains K and 0.52%, Q and 0.20%, V and 0.93%, X and 0.20%, Z and 0.09% for a subtotal of 1.94%.

The sum of the two high frequency row components 32.68% plus 37.34% yields a grand total of 70.02%, the High Frequency Row percentage shown in Table 8. The sum of the two middle frequency row components 14.78% plus 11.55% yields a grand total 26.33%. The sum of the two low frequency row components 1.71% plus 1.94% yields a grand total of 3.65%. The sum of the three 11-letter side components 32.68% plus 14.78% plus 1.71% yields a grand total 49.17%. The sum of the three 15-letter side components 37.34% plus 11.55% plus 1.94% yields a grand total 50.83%. These 11-letter side and 15-letter side grand totals apply to both right and left hands. These grand total percentages are shown in the "Keyboard Configuration System" column of Table 8.

TABLE 8

Cases 53 and 61
Competitive Activity Metrics

| KEYBOARD CONFIGURATION SYSTEM Case 61/53 | QWERTY LAYOUT | TWO-HAND DVORAK LAYOUT | ACTIVITY |
|---|---|---|---|
| 0 | 14 | 28 | Excess Forward Demerits |
| 4 | 27 | 31 | Backward Demerits |
| 70% | 53% | 71% | High Frequency Row |
| 26%/25% | 32% | 21% | Middle Frequency Row |
| 4%/5% | 15% | 8% | Low Frequency Row |
| 49% (R & L) | 42% (R) | 44% (L) | 11-Letter Hand |
| 51% (L & R) | 58% (L) | 56% (R) | 15-Letter Hand |

The maximum 9-letter row layout of the Keyboard Configuration System Case 53 has two alternate component percentages as follows. The middle frequency row of the 11-letter side contains C and 3.20%, D and 3.65%, F and 2.28%, L and 4.03% for a subtotal of 13.16%. The low frequency row of the 11-letter side contains B and 1.62%, G and 1.61%, J and 0.10% for a subtotal of 3.33%. The alternate sum of the two middle frequency row components 13.16% plus 11.55% yields a grand total 24.71%. The alternate sum of the two low frequency row components 3.33% plus 1.94% yields a grand total of 5.27%. These two alternate grand totals are displayed in the first column of Table 8 to the right of the slash symbols. The alternate component percentages do not affect grand totals for high frequency row, right hand or left hand activity.

The QWERTY layout has six component percentages as follows. The top row with high frequency usage on the left side contains Q and 0.20%, W and 2.03%, E and 12.31%, R and 6.03%, T and 9.59% for a subtotal of 30.16%. The center row with middle frequency usage on the left side contains A and 8.05%, S and 6.59%, D and 3.65%, F and 2.28%, G and 1.61% for a subtotal of 22.18%. The bottom row with low frequency usage on the left side contains Z and 0.09%, X and 0.20%, C and 3.20%, V and 0.93%, B and 1.62% for a subtotal of 6.04%. The top row with high frequency usage on the right side contains Y and 1.88%, U and 3.10%, I and 7.18%, O and 7.94%, P and 2.29% for a subtotal of 22.39%. The center row with middle frequency usage on the right side contains H and 5.14%, J and 0.10%, K and 0.52%, L and 4.03% for a subtotal of 9.79%. The bottom row with low frequency usage on the right side contains N and 7.19%, M and 2.25% for a subtotal of 9.44%.

The sum of the two top row with high frequency usage components 30.16% plus 22.39% yields a grand total 52.55%. The sum of the two center row with middle frequency usage components 22.18% plus 9.79% yields a grand total 31.97%. The sum of the two bottom row with low frequency usage components 6.04% plus 9.44% yields a grand total 15.48%. The sum of the three left side components 30.16% plus 22.18% plus 6.04% yields a grand total 58.38%. The sum of the three right side components 22.39% plus 9.79% plus 9.44% yields a grand total 41.62%. These grand totals are shown in the QWERTY layout column of Table 8.

The two-hand DVORAK layout has six component percentages as follows. The center row with high frequency usage on the left side contains A and 8.05%, 0 and 7.94%, E and 12.31%, U and 3.10%, I and 7.18% for a subtotal of 38.58%. The top row with middle frequency usage on the left side contains P and 2.29%, Y and 1.88% for a subtotal of 4.17%. The bottom row with low frequency usage on the left side contains Q and 0.20%, J and 0.10%, K and 0.52%, X and 0.20% for a subtotal of 1.02%. The center row with high frequency usage on the right side contains D and 3.65%, H and 5.14%, T and 9.59%, N and 7.19%, S and 6.59% for a subtotal of 32.16%. The top row with middle frequency usage on the right side contains F and 2.28%, G and 1.61%, C and 3.20%, R and 6.03%, L and 4.03% for a subtotal of 17.15%. The bottom row with low frequency usage on the right side contains B and 1.62%, M and 2.25%, W and 2.03%, V and 0.93%, Z and 0.09% for a subtotal of 6.92%.

The sum of the two center rows with high frequency usage components 38.58% plus 32.16% yields a grand total of 70.74%. The sum of the two top rows with middle frequency usage components 4.17% plus 17.15% yields a grand total of 21.32%. The sum of the two bottom rows with low frequency usage components 1.02% plus 6.92% yields a grand total of 7.94%. The sum of the three left side components 38.58% plus 4.17% plus 1.02% yields a grand total of 43.77%. The sum of the three right side components 32.16% plus 17.15% plus 6.92% yields a grand total 56.23%. These grand totals are shown in the Two Hand Dvorak Layout column of Table 8.

From the above, one can see the advantages and efficiencies of the Keyboard Configuration System set forth herein. The resulting keyboard string is generally alphabetical in progression with frequently used keys placed in position (by row segregation) for easy access and use by the typist/user.

Table 9 (Keyboard Configuration System overlay of QWERTY letters) shows that case 61 precisely matches the dimensions of letters in the QWERTY layout with 10 letters on the top row, nine letters on the center row, seven letters on the bottom row and with letters on all three rows left justified into column 01. For retrofitting purposes, this keyboard configuration may be particularly advantageous as when a QWERTY keyboard is replaced with a Keyboard Configuration System keyboard. The descending alphabet is required in order to achieve left justification for the Keyboard Configuration System. The 10 letters with middle frequency usage exactly fit on the top row without disturbing special symbols. The numerical equivalent values 25, 23, 21, 16, 13, 12, 06, 04, 03, 02 are converted respectively to letters Y, W, U, P, M, L, F, D, C, B. The nine letters with high frequency usage exactly fit on the center row without disturbing special symbols. The numerical equivalent values 20, 19, 18, 15, 14, 09, 08, 05, 01 are converted respectively to letters T, S, R, O, N, I, H, E, A. The seven letters with low frequency usage exactly fit on the bottom row without disturbing special symbols. The numerical equivalent values 26, 24, 22, 17, 11, 10, 07 are converted respectively to letters Z, X, V, Q, K, J, G. Of course, the overlay of Table 9 may be reversed to provide left-to-right progression for ascending alphabetical sequence.

TABLE 9

Keyboard Configuration System Overlay of QWERTY Letters - Case 61

| COLUMN LEFT | BOTTOM ROW | CENTER ROW | TOP ROW |
|---|---|---|---|
| 01 | Z | T | Y |
| 02 | X | S | W |
| 03 | V | R | U |
| 04 | Q | O | P |
| 05 | K | N | M |
| 06 | J | I | L |
| 07 | G | H | F |
| 08 |   | E | D |
| 09 |   | A | C |
| 10 RIGHT |   |   | B |

Table 10 (translation of QWERTY letters) contains 26 letter-to-letter relationships. For example, the three left justified letters from top to bottom rows in the QWERTY layout are Q, A, Z. Letter Q converts to Y, letter A converts to T, and letter Z remains the same as before. Therefore, the three left justified letters from top to bottom rows in the comparable Keyboard Configuration System layout are Y, T, Z. The three letters S, W, X also remain the same as before. The four unchanging letters are flagged in Table 10 by equal signs.

TABLE 10

Case 61
Translation of QWERTY Letters

| QWERTY | KEYBOARD CONFIGURATION SYSTEM |
|---|---|
| A | T |
| B | K |
| C | V |
| D | R |
| E | U |
| F | O |
| G | N |
| H | I |
| I | D |
| J | H |
| K | E |
| L | A |
| M | G |
| N | J |
| O | C |
| P | B |
| Q | Y |
| R | P |
| S | =S |
| T | M |
| U | F |
| V | Q |
| W | =W |
| X | =X |
| Y | L |
| Z | =Z |

Table 11 (Keyboard Configuration System overlay of two-hand DVORAK letters) shows that case 61 precisely matches the dimensions of letters in the two-hand DVORAK layout with seven letters on the top row, 10 letters on the center row, nine letters on the bottom row and with letters on all three rows right justified into column 10. This configuration provides an easy retrofit to the two-hand Dvorak keyboards by the present system. The ascending alphabet is required in order to achieve right justification for the Keyboard Configuration System. The seven letters G, J, K, Q, V, X, Z with low frequency usage exactly fit on the top row without disturbing special symbols. The 10 letters B, C, D, F, L, M, P, U, W, Y with middle frequency usage exactly fit on the center row without disturbing special symbols. The nine letters A, E, H, I, N, O, R, S, T with high frequency usage exactly fit on the bottom row without disturbing special symbols.

TABLE 11

Keyboard Configuration System
Overlay of Two-Hand DVORAK Letters - Case 61

| COLUMN LEFT | BOTTOM ROW | CENTER ROW | TOP ROW |
|---|---|---|---|
| 01 |  | B |  |
| 02 | A | C |  |
| 03 | E | D |  |
| 04 | H | F | G |
| 05 | I | L | J |
| 06 | N | M | K |
| 07 | O | P | Q |
| 08 | R | U | V |
| 09 | S | W | X |
| 10 RIGHT | T | Y | Z |

Table 12 (translation of DVORAK letters) contains 26 letter-to-letter relationships. For example, the three right justified letters from top to bottom rows in the DVORAK layout are L, S, and Z. Letter L converts to Z, letter S converts to Y, letter Z converts to T. Therefore, the three right justified letters from top to bottom rows in the comparable Keyboard Configuration System layout are Z, Y, T. There were no letters that remained the same as before, and so there was no opportunity for unchanging letters to be flagged in Table 12 by equal signs.

TABLE 12

Case 61
Translation of DVORAK Letters

| TWO-HAND DVORAK | KEYBOARD CONFIGURATION SYSTEM - Case 61 |
|---|---|
| A | B |
| B | N |
| C | V |
| D | M |
| E | D |
| F | K |
| G | Q |
| H | P |
| I | L |
| J | E |
| K | H |
| L | Z |
| M | O |
| N | W |
| O | C |
| P | G |
| Q | A |
| R | X |
| S | Y |
| T | U |
| U | F |
| V | S |
| W | R |
| X | I |
| Y | J |
| Z | T |

Table 13 (one example of a left-justified maximum nine letter row solution such as those shown in FIGS. 9–16) illustrates eight letters on the top row, nine letters on both center and bottom rows, and letters on all three rows left justified into column 01. No letters extend into column 10. The descending alphabet is required in order to achieve left justification for the Keyboard Configuration System and avoid any demerit-causing shifts. The eight letters with low frequency usage are located on the top row. The numerical equivalent values 26, 24, 23, 17, 11, 10, 07, 02 are converted respectively to letters Z, X, V, Q, K, J, G, B. The nine letters T, S, R, O, N, I, H, E, A with high frequency usage are located on the center row. The nine letters with middle frequency usage are located on the bottom row. The numerical equivalent values 25, 23, 21, 16, 13, 12, 06, 04, 03 are converted respectively to letters Y, W, U, P, M, L, F, D, C. In this illustration the high and middle frequency usage letters are not separated by the top row of low frequency usage letters.

TABLE 13

One Example of Left Justified Maximum 9-Letter Row Solution

| COLUMN LEFT | BOTTOM ROW | CENTER ROW | TOP ROW |
|---|---|---|---|
| 01 | Y | T | Z |
| 02 | W | S | X |
| 03 | U | R | V |
| 04 | P | O | Q |
| 05 | M | N | K |
| 06 | L | I | J |
| 07 | F | H | G |
| 08 | D | E | B |
| 09 RIGHT | C | A |  |

Table 14 (one example of a right-justified maximum nine letter row solution such as those shown FIGS. 9–16) illustrates nine letters on both top and center rows, eight letters on the bottom row, and letters on all three rows right justified into column 10. No letters extend into column 01. The ascending alphabet is required in order to achieve right justification for the Keyboard Configuration System. The nine letters A, E, H, I, N, O, R, S, T with high frequency usage are located on the top row. The nine letters C, D, F, L, M, P, U, W, Y, with middle frequency usage are located on the center row. The eight letters B, G, J, K, Q, V, X, Z with low frequency usage are located on the bottom row. In this illustration, the high and middle frequency usage letters are not separated by the bottom row of low frequency usage letters.

TABLE 14

One Example of Right Justified Maximum 9-Letter Row Solution

| COLUMN LEFT | BOTTOM ROW | CENTER ROW | TOP ROW |
|---|---|---|---|
| 02 |  | C | A |
| 03 | B | D | E |
| 04 | G | F | H |
| 05 | J | L | I |
| 06 | K | M | N |
| 07 | Q | P | O |
| 08 | V | U | R |
| 09 | X | W | S |
| 10 RIGHT | Z | Y | T |

Numerical equivalent values have been converted to letters in the Keyboard Configuration System results that are presented in Table 9, Table 11, Table 13 and Table 14. In these tables, the letters are listed vertically with a "left" notation at the head of the three lists and with a "right"

notation at the foot of the three lists. Consequently, all letters in the lists are turned 90 degrees counterclockwise from their intended orientation in a real keyboard. This problem is resolved in a series of 16 figures, FIGS. 1–16. Letters are distributed horizontally across the top, center and bottom rows. For each row in these 16 figures, the number of columns is cited, and the high, middle, or low frequency is cited with the corresponding percent usage. Each of these 16 figures cites the descending or ascending alphabetical sequence, which respectively determines the left or right justification of the layout. All 16 of these figures have high and middle frequency usage rows that are not separated by the low frequency usage row. Eight configurations are not shown (but are easily determined) that have the high and middle frequency usage rows separable. The first group of eight figures has a 10-column maximum. A second group of eight figures has a 9-column maximum. In addition, there is a third group of eight defined configurations for which no illustrated figures are presented here.

FIG. 1, for configuration I, shows a 10-column maximum, descending alphabet, and middle over high over low frequency usage sets. This configuration has dimensions that overlay all letters in a QWERTY layout without disturbing special symbols, such as punctuation marks. The bolded squares may be used as "home" keys for touch-typing and the like. FIG. 2, for configuration II, shows a 10-column maximum, ascending alphabet, and low over middle over high frequency usage sets. This configuration has dimensions that overlay all letters in a two-hand DVORAK layout without disturbing special symbols. FIG. 3, for configuration III, shows a 10-column maximum, descending alphabet, and low over middle over high frequency usage sets. FIG. 4, for configuration IV, shows a 10-column maximum, ascending alphabet, and middle over high over low frequency usage sets.

Figure 5:
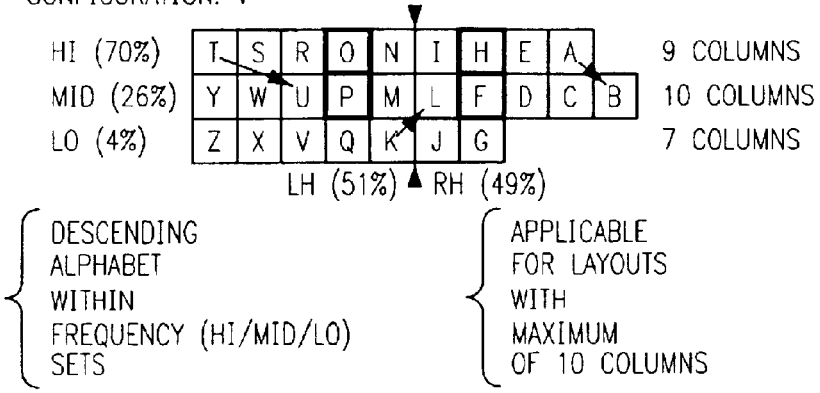
Figure 6:
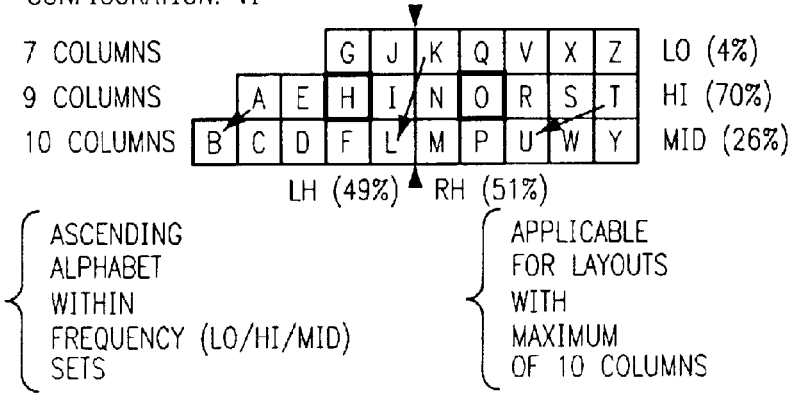

FIG. 5, for configuration V, shows a 10-column maximum, descending alphabet, and high over middle over low frequency usage sets. FIG. 6, for configuration VI shows a 10-column maximum, ascending alphabet, and low over high over middle frequency usage sets. FIG. 7, for configuration VII, shows a 10-column maximum, descending alphabet, and low over high over middle frequency usage sets. FIG. 8, for configuration VIII, shows a 10-column maximum, ascending alphabet, and high over middle over low frequency usage sets.

FIG. 9, for configuration IX, shows a 9-column maximum, descending alphabet, and middle over high over low frequency usage sets. FIG. 10, for configuration X, shows a 9-column maximum, ascending alphabet, and low over middle over high frequency usage sets. FIG. 11, for configuration XI, shows a 9-column maximum, descending alphabet, and low over middle over high frequency usage sets. FIG. 12, for configuration XII, shows a 9-column maximum, ascending alphabet, and middle over high over low frequency usage sets.

FIG. 13, for configuration XIII, shows a 9-column maximum, descending alphabet, and high over middle over low frequency usage sets. FIG. 14, for configuration XIV, shows a 9-column maximum, ascending alphabet, and low over high over middle frequency usage sets. FIG. 15, for configuration XV, shows a 9-column maximum, descending alphabet, and low over high over middle frequency usage sets. FIG. 16, for configuration XVI, shows a 9-column maximum, ascending alphabet, and high over middle over low frequency usage sets.

Configurations XVII–XXIV are not shown in the Figures, but are readily obtained. Configuration XVII, has a 10-column maximum, descending alphabet, and middle over low over high frequency usage sets. Configuration XVIII, has a 10-column maximum, ascending alphabet, and middle over low over high frequency usage sets. Configuration XIX, has a 10-column maximum, descending alphabet, and high over low over middle frequency usage sets. Configuration XX has a 10-column maximum, ascending alphabet, and high over low over middle frequency usage sets.

Configuration XXI has a 9-column maximum, descending alphabet, and middle over low over high frequency usage sets. Configuration XXII has a 9-column maximum, ascending alphabet, and middle over low over high frequency usage sets. Configuration XXIII has a 9-column maximum, descending alphabet, and high over low over middle frequency usage sets. Configuration XXIV has a 9-column maximum, ascending alphabet, and high over low over middle frequency usage sets.

The application of the Keyboard Configuration System to the 26 letters of the English language alphabet provides results that are both interesting and useful. The three row parameter is used in conjunction with the 10 column maximum parameter and the six column minimum parameter, as indicated above. The set lengths of 6, 7, 8, 9, and 10 columns are thereby defined. The 15 resulting strings of ranking value ranges (key sets) are subsequently defined, as are the four patterns of two, five, eight and nine shifts. Consequently all 96 initial case numbers are specified in the Appendix Index document. The Appendix Index, and all the information contained in it, is rigid, or static, and therefore reusable for second and subsequent applications to the 26 letters of the English language alphabet. Case number values are incremented herein progressively by 100 for each additional application or variation, as indicated below.

Case numbers 101 through 496 cover four additional applications, which correspond to different letter-usage frequencies that have been determined for the English alphabet and language.

The 96 case numbers 101 through 196 for the second application use data from the book "The Code Breakers" by David Kahn. The letter frequency order from this source in descending sequence E. T, A, O, N, I, R, S, H, D, L, U, C, M, P, F, Y, W, G, B, V, J, K, Q, X, Z. This is a different frequency sequence than the ones used for Cases 1–96 arising from Gaines/Meaker.

The 96 case numbers 201 through 296 for the third application use data from the book "Secret And Urgent: The Story Of Codes And Ciphers" by Fletcher Pratt. The letter frequency order from this source in descending sequence: E, T, A, O, N, R, I, S, H, D, L, F, C, M, U, G, Y, P, W, B, V, K, X, J, Q, Z.

The 96 case numbers 301 through 396 for the fourth application use data from the book "Cryptography" by Laurence D. Smith. The letter frequency order from this source in descending sequence: E, T, O, A, N, I, R, S, H, D, L, C, W, U, M, F, Y, G, P, B, V, K, X, Q, J, Z.

The 96 case numbers 401 through 496 for the fifth application use data from the book "Elementary Cryptography and Cryptanalysis" by Donald Milliken. The letter frequency order from this source in descending sequence E, T, N, R, O, I, A, S, D, H, L, C, F, U, P, M, Y, G, W, V, B, X, K, Q, J, Z.

Identical outstanding results are achieved by processing the last ($96^{th}$) case number in the second, third and fourth applications. Case numbers 196, 296 and 396 have set lengths for 10, 10 and 6 for the respective high, middle and low frequency letter groups. In addition, a maximum shift 5 of 5 is in effect for the low frequency letter group. Improved keyboard configurations are revealed despite differences in source data, namely, the letter frequency order for each application.

The first 10 letters of the frequency order for the second application are: E, T, A, O, N, I, R, S, H, D. Their respective numerical equivalent values are: 05, 20, 01, 15, 14, 09, 18, 19, 08, 04. The first 10 letters of the frequency order for the third application are: E, T, A, O, N, R, I, S, H, D. Their respective numerical equivalent values are: 05, 20, 01, 15, 14, 18, 09, 19, 08, 04. The first ten letters of the frequency order for the fourth application are: E, T, O, A, N, I, R, S, H, D. Their respective equivalent values are: 05, 20, 15, 01, 14, 09, 18, 19, 08, 04. When the above three sets are sorted separately, an identical set results: 01, 04, 05, 08, 09, 14, 15, 18, 19, 20. This sorted set of values is entered into the high frequency list for case numbers 196, 296 and 396.

The second 10 letters of the frequency order for the second application are: L, U, C, M, P, F, Y, W, G, B. Their respective numerical equivalent values are: 12, 21, 03, 13, 16, 06, 25, 23, 07, 02. The second 10 letters of the frequency order for the third application are: L, F C, M, U, G, Y, P, W, B. Their respective numerical equivalent values are: 12, 06, 03, 13, 21, 07, 25, 16, 23, 02. The second 10 letters of the frequency order for the fourth application are: L, C, W, U, M, F, Y, G, P, B. Their respective numerical equivalent values are: 12, 03, 23, 21, 13, 06, 25, 07, 16, 02. When the above three sets are sorted separately, an identical set results: 02, 03, 06, 07, 12, 13, 16, 21, 23, 25. This sorted set of values is entered into the middle frequency list for case numbers 196, 296 and 396.

The last six letters of the frequency order for the second application are: V, J, K, Q, X, Z. Their respective numerical equivalent values are: 22, 10, 11, 17, 24, 26. The last six letters of the frequency order for the third application are: V, K, X, J, Q, Z. Their respective numerical equivalent values are: 22, 11, 24, 10, 17, 26. The last six letters of the frequency order for the fourth application are: V, K, X, Q, J, Z. Their respective numerical equivalent values are: 22, 11, 24, 17, 10, 26. When the above three sets are sorted separately, an identical set results: 10, 11, 17, 22, 24, 26. This sorted set of values is entered into the low frequency list for case numbers 196, 296 and 396. Shift 5 of 5 is in force for these case numbers, and so the six values locate from positions 05 through 10.

Case numbers 196, 296 and 396 are evaluated separately for demerits but, of course, the results are identical. The excess forward tallies are all 0. There are only two events that accumulate backward demerits. The movement between numerical equivalents 11 (letter K) and 12 (letter L) scores one backward demerit. The movement between numerical equivalents 20 (letter T) and 21 (letter U) scores two backward demerits. The backward tallies are all 3. Each total demerit tally is the sum of 0 excess forward demerits plus three backward demerits equals three demerits.

The second, third and fourth applications independently find the solution that is depicted in Table 15 (numerical equivalent solution normalized for comparison). The high, middle and low frequency lists from case numbers 196, 296 and 396 are inverted during their transfer to Table 15. Turning these three lists upside down facilitates the inevitable comparison to Table 6, which portrays the dual solutions developed earlier by the first application of the Keyboard Configuration System. At a minimum, there are 21 letter locations that are the same in Tables 6 and 15. If all 10 columns in the middle ranking row of Table 6 are candidates for comparison, then numerical equivalent 02 (letter B) is pre-moved within Table 6. On that basis, there are 22 letter locations that are the same in Tables 6 and 15.

TABLE 15

Case 196
Numerical Equivalent Solution Normalized for Comparison

| COLUMN | HIGH RANKING ROW | MIDDLE RANKING ROW | LOW RANKING ROW |
|---|---|---|---|
| 01 | 20 | 25 | 26 |
| 02 | 19 | 23 | 24 |
| 03 | 18 | 21 | 22 |
| 04 | 15 | 16 | 17 |
| 05 | 14 | 13 | 11 |
| 06 | 09 | 12 | 10 |
| 07 | 08 | 07 | |
| 08 | 05 | 06 | |
| 09 | 04 | 03 | |
| 10 | 01 | 02 | |

An analysis of the relocation of four remaining letters follows in sequence. Numerical equivalent 01 (letter A) remains in the high ranking row, but moves from column 09 in Table 6 to column 10 in Table 15. Numerical equivalent 04 (letter D) in column 08 of the middle ranking row in Table 6 moves to column 09 of the high ranking row in Table 15. Numerical equivalent 06 (letter F) remains in the middle ranking row, but moves from column 07 in Table 6 to column 08 in Table 15. Numerical equivalent 07 (letter G) in column 07 of the low ranking row in Table 6 moves to column 07 of the middle ranking row in Table 15.

One of the solutions in Table 6 with set lengths 10, 9 and 7 columns exactly accommodates overlays of both the QWERTY and the two-hand DVORAK layouts. The solution in Table 15 with set lengths 10, 10 and 6 columns can closely approximate overlays of both the QWERTY and the two-hand DVORAK layouts, but a minimum of one special symbol key is necessarily impacted. It is interesting that the same special symbol key is affected in both layouts. The nine letters on the center row of the QWERTY layout are adjacent to the key with lower case semicolon and upper case colon. The nine letters on the bottom row of the two-hand DVORAK layout are also adjacent to the key with lower case semicolon and upper case colon. The problems arise when the solution is Table 15 is implemented, and 10 letters are imposed upon the center row of the QWERTY layout and the bottom row of the two-hand DVORAK layout. The focus here on identical special symbol keys is a prelude to a uniform outcome.

Table 16 (12 configurations defined by one solution) describes the two components that differentiate the configurations. The 10-letter versus 9-letter maximum shown in Table 7 is absent from Table 16, because the latter is based on a solution with twin 10 letter rows. Eight of the configurations have low frequency sets on top or bottom rows. Four of the configurations have low frequency sets on the center row.

TABLE 16

Case 196
12 Configurations Defined by 1 Solution

NUMBER OF CONFIGURATIONS OPTIONS

| | |
|---|---|
| 6 | High/Middle/Low Frequency Sets Versus Top/Center/Bottom Rows |

TABLE 16-continued

Case 196
12 Configurations Defined by 1 Solution

| NUMBER OF CONFIGURATIONS | OPTIONS |
|---|---|
| 2 | Left Side Column Justification Versus Right Side Column Justification |
| 12 | Multiplication Product |

Table 17 (competitive activity metrics) shows improved performance figures for the Keyboard Configuration System (cases 196, 296 and 396) when compared to prior results of the first application reported in Table 8 (for cases 61 and 53). The 0 excess forward demerits tally and the lower three backward demerits tally are reported. Source data from the first, second, third and fifth applications was used to calculate percentage utilization for the high, middle and low frequency rows. Percentage data was not available from the fourth application. The 10 letters A, D, E, H, I, N, O, R, S, and T were used in four applications to calculate high frequency row percentage utilization. The respective figures for the first, second, third and fifth applications are 73.67%, 74%, 75.142% and 74.1% with a higher average 74.2% reported. The 10 letters B, C, F, G, L, M, P, U, W and Y were used in four applications to calculate middle frequency row percentage utilization. The respective figures for the first, second, third and fifth applications are 24.29%, 23%, 23.003% and 23.2% with a lower average 23.4% reported. The six letters J, K, Q, V, X and Z were used in four applications to calculate low frequency row percentage utilization. The respective figures for the first, second, third and fifth applications are 2.04%, 3%, 1.836% and 2.7% with a lower average 2.4% reported. These three average percentages mean that roughly three out of four letter keystrokes are on the high frequency row, roughly one out of four letter key strokes are on the middle frequency row and roughly one out of 40 letter key strokes are on the low frequency row. Percentage utilization for the 11-letter hand and the 15-letter hand remained constant, because the relocated letters A, B, D, F and G are all on the 11-letter hand side.

TABLE 17

Case 196
Competitive Activity Metrics

| KEYBOARD CONFIGURATION SYSTEM | ACTIVITY |
|---|---|
| 0 | Excess Forward Demerits |
| 3 | Backward Demerits |
| 74.2% Av. | High Frequency Row |
| 23.4% Av. | Middle Frequency Row |
| 2.4% Av. | Low Frequency Row |
| 49% (R&L) | 11-Letter Hand |
| 51% (L&R) | 15-Letter Hand |

Table 18, one Keyboard Configuration System overlay of QWERTY letters and semicolon key (corresponding to cases 196, 296 and 396 associated with Table 15), has one more letter on the center row and one less letter on the bottom row than the QWERTY layout. The high frequency letter A on the center row has displaced the semicolon/colon key in column 10. The minimum 1-step relocation places the semicolon/colon key on the bottom row in column 07 next to low frequency letter J. For example, a 3-step relocation places the semicolon key on the bottom row in column 09, displacing the period/greater-than key. The next step places the period/greater-than key on the bottom row in column 08, displacing the comma/less-than key. The last step places the comma/less-than key on the bottom row in column 07 next to low frequency letter J.

TABLE 18

Case 196
One Keyboard Configuration System Overlay of
QWERTY Letters and Semicolon Colon Key

| COLUMN LEFT | BOTTOM ROW | CENTER ROW | TOP ROW |
|---|---|---|---|
| 01 | Z | T | Y |
| 02 | X | S | W |
| 03 | V | R | U |
| 04 | Q | O | P |
| 05 | K | N | M |
| 06 | J | I | L |
| 07 | Two symbols | H | G |
| 08 | | E | F |
| 09 | | D | C |
| 10 RIGHT | | A | B |

Table 19 (one translation of QWERTY letters and semicolon/colon symbols) lists corresponding values between the QWERTY layout and the Keyboard Configuration System overlay of Table 18. The four letters S, W, X, Z remain in the same locations, and are highlighted in the listing with equal signs. The semicolon/colon key is replaced by the letter A. The letter M is replaced by the semicolon/colon key or a key with a different pair of special symbols, depending upon the number of steps in the chain relocation for special symbol keys.

TABLE 19

Case 196
One Translation of QWERTY Letters
and Semicolon Colon Symbols

| QWERTY | KEYBOARD CONFIGURATION SYSTEM - Case 196 |
|---|---|
| A | T |
| B | K |
| C | V |
| D | R |
| E | U |
| F | O |
| G | N |
| H | I |
| I | F |
| J | H |
| K | E |
| L | D |
| M | Two Symbols |
| N | J |
| O | C |
| P | B |
| Q | Y |
| R | P |
| S | =S |
| T | M |
| U | G |
| V | Q |
| W | =W |
| X | =X |

TABLE 19-continued

Case 196
One Translation of QWERTY Letters
and Semicolon Colon Symbols

| QWERTY | KEYBOARD CONFIGURATION SYSTEM - Case 196 |
|---|---|
| Y | L |
| Z | =Z |
| Colon/Semicolon | A |

Table 20 shows the Keyboard Configuration System overlay of two-hand DVORAK letters and semicolon/colon key per Table 15 and has one more letter on the bottom row and one less letter on the top row than the two-hand DVORAK layout. The middle frequency letter B on the bottom row has displaced the semicolon/colon key in column 01. The minimum 1-step relocation places the semicolon/colon key on the top row in column 04 next to low frequency letter J. For example, a 3-step relocation places the semicolon/colon key on the top row in column 02, displacing the comma/less than key. The next step places the comma/less than key on the top row in column 03, displacing the period/greater than key. The last step places the period/greater than key on the top row in column 04 next to low frequency letter J.

TABLE 20

Case 196
One Keyboard Configuration System Overlay of
Two-Hand DVORAK Letters and Semicolon Colon Key

| COLUMN LEFT | BOTTOM ROW | CENTER ROW | TOP ROW |
|---|---|---|---|
| 01 | B | A | |
| 02 | C | D | |
| 03 | F | E | |
| 04 | G | H | Two symbols |
| 05 | L | I | J |
| 06 | M | N | K |
| 07 | P | O | Q |
| 08 | U | R | V |
| 09 | W | S | X |
| 10 | Y | T | Z |
| RIGHT | | | |

Table 21 lists corresponding values between the two-hand DVORAK layout and the Keyboard Configuration System overlay of Table 20. The three letters A, E, I remain in the same locations, and are highlighted in the listing with equal signs. The semicolon/colon key is replaced by the letter B. The letter P is replaced by the semicolon/colon key or a key with a different pair of special symbols, depending upon the number of steps in the chain of relocation for special symbol keys.

TABLE 21

Case 196
One Translation of Two-Hand DVORAK
Letters and Semicolon Colon Symbols

| TWO-HAND DVORAK | KEYBOARD CONFIGURATION SYSTEM |
|---|---|
| A | =A |
| B | M |

TABLE 21-continued

Case 196
One Translation of Two-Hand DVORAK
Letters and Semicolon Colon Symbols

| TWO-HAND DVORAK | KEYBOARD CONFIGURATION SYSTEM |
|---|---|
| C | V |
| D | N |
| E | =E |
| F | K |
| G | Q |
| H | O |
| I | =I |
| J | F |
| K | G |
| L | Z |
| M | P |
| N | S |
| O | D |
| P | Two Symbols |
| Q | C |
| R | X |
| S | T |
| T | R |
| U | H |
| V | W |
| W | U |
| X | L |
| Y | J |
| Z | Y |
| Colon/Semicolon | B |

Table 22 shows the Keyboard Configuration System overlay of QWERTY letters and semicolon/colon key along the lines of Table 18 and has one more letter on the center row and one less letter on the bottom row than the QWERTY layout. The middle frequency letter B on the center row has displaced the semicolon/colon key in column 10. The minimum 1-step relocation places the semicolon/colon key on the bottom row in column 07 next to low frequency letter J. For example, a 3-step relocation places the semicolon/colon key on the bottom row in column 09, displacing the period/greater than key. The next step places the period/greater than key on the bottom row in column 08, displacing the comma/less than key. The last step places the comma/less than key on the bottom row in column 07 next to low frequency letter J.

TABLE 22

Case 196
Another Keyboard Configuration System Overlay
of QWERTY Letters and Semicolon Colon Key

| COLUMN | BOTTOM ROW | CENTER ROW | TOP ROW |
|---|---|---|---|
| LEFT | | | |
| 01 | Z | Y | T |
| 02 | X | W | S |
| 03 | V | U | R |
| 04 | Q | P | O |
| 05 | K | M | N |
| 06 | J | L | I |
| 07 | Two Symbols | G | H |
| 08 | | F | E |
| 09 | | C | D |
| 10 | | B | A |
| RIGHT | | | |

Table 23 lists corresponding values between the QWERTY layout and the Keyboard Configuration System overlay of Table 22. The two letters X, Z remain in the same locations, and are highted in the listing with equal signs. The semicolon/colon key is replaced by the letter B. The letter M is replaced by the semicolon/colon key or a key with a different pair of special symbols, depending upon the number of steps in the chain of relocation for special symbol keys.

TABLE 23

Case 196
Another Translation of QWERTY Letters and Semicolon Colon Symbols

| QWERTY | KEYBOARD CONFIGURATION SYSTEM - Case 196 |
|---|---|
| A | Y |
| B | K |
| C | V |
| D | U |
| E | R |
| F | P |
| G | M |
| H | L |
| I | E |
| J | G |
| K | F |
| L | C |
| M | Two symbols |
| N | J |
| O | D |
| P | A |
| Q | T |
| R | O |
| S | W |
| T | N |
| U | H |
| V | Q |
| W | S |
| X | = X |
| Y | I |
| Z | = Z |
| Colon, Semicolon | B |

Table 24 shows the Keyboard Configuration System overlay of two-hand DVORAK letters and semicolon/colon key along the lines of Table 20 and has one more letter on the bottom row and one less letter on the top row than the two-hand DVORAK layout. The high frequency letter A on the bottom row has displaced the semicolon/colon key in column 01. The minimum 1-step relocation places the semicolon/colon key on the top row in column 04 next to low frequency letter J. For example, a 3-step relocation places the semicolon/colon key on the top row in column 02, displacing the comma/less than key. The next step places the comma/less than key on the top row in column 03, displacing the period/greater than key. The last step places the period/greater than key on the top row in column 04 next to low frequency letter J.

TABLE 24

Case 196
Another Keyboard Configuration System Overlay of
Two-Hand DVORAK Letters and Semicolon Colon Key

| COLUMN | BOTTOM ROW | CENTER ROW | TOP ROW |
|---|---|---|---|
| LEFT | | | |
| 01 | A | B | |
| 02 | D | C | |
| 03 | E | F | |
| 04 | H | G | Two Symbols |
| 05 | I | L | J |
| 06 | N | M | K |
| 07 | O | P | Q |

TABLE 24-continued

Case 196
Another Keyboard Configuration System Overlay of
Two-Hand DVORAK Letters and Semicolon Colon Key

| COLUMN | BOTTOM ROW | CENTER ROW | TOP ROW |
|---|---|---|---|
| 08 | R | U | V |
| 09 | S | W | X |
| 10 | T | Y | Z |
| RIGHT | | | |

Table 25 lists corresponding values between the two-hand DVORAK layout and the Keyboard Configuration System overlay of Table 24. None of the 26 letters remain in the same locations, and therefore none are highlighted in the listing with equal signs. The semicolon/colon key is replaced by the letter A. The letter P is replaced by the semicolon/colon key or a key with a different pair of special symbols, depending upon the number of steps in the chain of relocation for special symbol keys.

TABLE 25

Case 196
Another Translation of
Two-Hand DVORAK Letters and Semicolon Colon Symbols

| TWO-HAND DVORAK | KEYBOARD CONFIGURATION SYSTEM - Case 196 |
|---|---|
| A | B |
| B | N |
| C | V |
| D | M |
| E | F |
| F | K |
| G | Q |
| H | P |
| I | L |
| J | E |
| K | H |
| L | Z |
| M | O |
| N | W |
| O | C |
| P | Two Symbols |
| Q | D |
| R | X |
| S | Y |
| T | U |
| U | G |
| V | S |
| W | R |
| X | I |
| Y | J |
| Z | T |
| Colon/Semicolon | A |

Eight configurations for cases 196, 296, and 396 with the twin 10-column rows have the middle frequency letters located either directly above or directly below the high frequency letters. These are shown in FIGS. 17–24. FIG. 17, for configuration XXV, shows a 10-column maximum, descending alphabet and middle, high and low frequency letters located on top, center and bottom rows, respectively. This configuration overlays the letters and the semicolon/colon key of the QWERTY layout.

FIG. 18, for configuration XXVI, shows a 10-column maximum, ascending alphabet, and low, high, and middle frequency letters located on top, center, and bottom rows, respectively. This configuration overlays the letters and the semicolon/colon key of the two-hand DVORAK layout.

Figure 19:
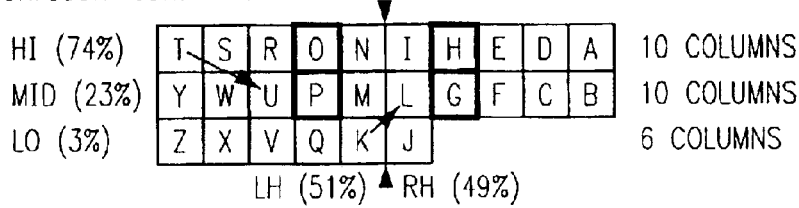

FIG. 19, for configuration XXVII, shows a 10-column maximum, descending alphabet and high, middle and low frequency letters located on top, center and bottom rows, respectively. This configuration overlays the letters and the semicolon/colon key of the QWERTY layout.

Figure 20:
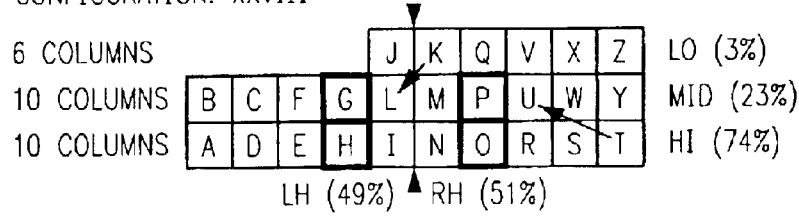
Figure 21:
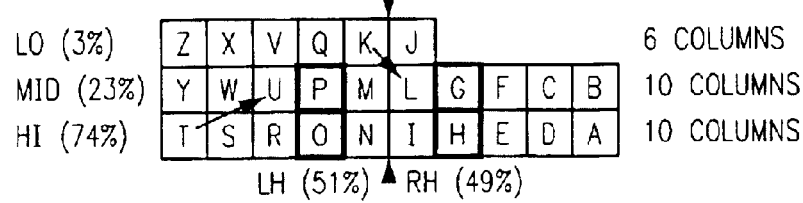

FIG. 20, for configuration XXVIII, shows a 10-column maximum, ascending alphabet and low, middle and high frequency letters located on top, center and bottom rows, respectively. This configuration overlays the letters and the semicolon/colon key of the two-hand DVORAK layout. FIG. 21, for configuration XXIX, shows a 10-column maximum, descending alphabet and low, middle and high frequency letters located on top, center and bottom rows, respectively. FIG. 22, for configuration XXX, shows a 10-column maximum, ascending alphabet and high, middle and low frequency letters located on top, center and bottom rows, respectively. FIG. 23, for configuration XXXI shows a 10-column maximum, descending alphabet and low, high and middle frequency letters located on top, center and bottom rows, respectively. FIG. 24, for configuration XXXII, shows a 10-column maximum, ascending alphabet and middle, high and low frequency letters located on top, center and bottom rows, respectively.

Four configurations with the twin 10-column rows have the low frequency letters separating the middle frequency letters from the high frequency letters. Configuration XXXIII has a 10-column maximum, descending alphabet and middle, low and high frequency letters located on top, center and bottom rows, respectively. Configuration XXXIV has a 10-column maximum, ascending alphabet and high, low and middle frequency letters located on top, center and bottom rows, respectively. Configuration XXXV has a 10-column maximum, descending alphabet and high, low and middle frequency letters located on top, center and bottom rows, respectively. Configuration XXXVI has a 10-column maximum, and ascending alphabet and middle, low and high frequency letters located on top, center and bottom rows, respectively.

One additional solution of interest is present in case 317 in the fourth application of the Keyboard Configuration System. One backward demerit is measured between numerical equivalent values 02 and 03 (letters B and C). One backward demerit is measured between numerical equivalent values 13 and 14 (letters M and N). The total of backward demerits is 2. There are no excess forward demerits. The total of all demerits is therefore also 2. This is the lowest demerit total value measured to date and may be a preferred embodiment. The shift of case 317 is neither at the minimum (1 of 8) nor at the maximum (8 of 8). The shift (4 of 8) for this solution positioned the high frequency set in a location that is indented from both the initial position (01) and the other extreme position (10). This somewhat centered location contributed to an equal division of 13 letters per hand.

Table 26 (Final Numerical Equivalent Solution Normalized for Comparison) portrays case 317 by showing an embodiment where only two of three string sets are justified into column 01. The high frequency set is indented into column 03. Numerical equivalent values 20 and 21 (letters T and U) are in the same column 03. This alignment eliminates the two backward demerits measured between letters T and U in all prior solutions. The low frequency set with nine entries is larger than the low frequency sets in all prior solutions. The newest numerical equivalent 16 (letter P) in the low frequency set together with numerical equivalents 02 and 07 (letters. B and G) vacate three positions from the middle frequency set of a prior solution. These three vacancies are filled by numerical equivalents 04, 08, and 19 (letters D, H, and S), which in turn vacate three positions from the high frequency set of a prior solution. The current high frequency set consists of just seven letters, which extend across columns 03 through 09. After the new middle frequency set is rearranged, the relocated numerical equivalents 04, 08 and 19 (letters D, H and S) are respectively positioned in columns 09, 07 and 04. These three columns are aligned respectively with high frequency numerical equivalents 01, 09 and 18 (letters A, I and R). It is a benefit of this solution that formerly high frequency letters D, H and S are somewhat centered columnwise albeit on the middle frequency row. Location of letters D, H and S is compatible with the centering of seven high frequency letters by means of the shifting process.

TABLE 26

FINAL NUMERICAL EQUIVALENT SOLUTION
NORMALIZED FOR COMPARISON
CASE 317

| COLUMN | HIGH RANKING ROW | MIDDLE RANKING ROW | LOW RANKING ROW |
|---|---|---|---|
| 01 |    | 25 | 26 |
| 02 |    | 23 | 24 |
| 03 | 20 | 21 | 22 |
| 04 | 18 | 19 | 17 |
| 05 | 15 | 13 | 16 |
| 06 | 14 | 12 | 11 |
| 07 | 09 | 08 | 10 |
| 08 | 05 | 06 | 07 |
| 09 | 01 | 04 | 02 |
| 10 |    | 03 |    |

Table 27 (Final Competitive Activity Metrics) displays quantities that describe the solution of case 317 from the fourth application of the Keyboard Configuration System. The column by column alphabetic progression is excellent with 0 excess forward demerits and merely two backward demerits. There are two backward events with the minimum of one demerit per event. Compared to 41 total demerits for the QWERTY layout and 59 total demerits for the two-hand DVORAK layout, the two total demerits for this Keyboard Configuration System solution represents at least a 95% reduction in the out of alphabetical sequence conditions of prior art. A reduction of 39 demerits is 95.1% of 41 QWERTY demerits. A reduction of 57 demerits is 96.6% of 59 two-hand DVORAK demerits.

TABLE 27

FINAL COMPETITIVE ACTIVITY METRICS
CASE 317

| KEYBOARD CONFIGURATION SYSTEM | ACTIVITY |
|---|---|
| 0 | Excess Forward Demerits |
| 2 | Backward Demerits |
| 59.0% Av. | High Frequency Row |
| 33.3% AV. | Middle Frequency Row |
| 7.7% Av. | Low Frequency Row |
| 56.6% Av. (R&L) | One 13-Letter Hand (Letter "A" Side) |
| 43.4% Av. (L&R) | Other 13-Letter Hand (Letter "Z" Side) |

The last five of the listed activities in Table 27 are measured by percentages. However no source percentages by letter are available from the fourth application of the Keyboard Configuration System. Consequently, the average percentage values displayed are developed using source percentages by letter from the first, second, third and fifth applications. The seven letters on the high frequency row are A, E, I, N, O, R, T. Their subtotal percentages from the first, second, third and fifth applications respectively are 58.29%, 58%, 59.994% and 59.9% with a displayed average 59.0%. The 10 letters on the middle frequency row are C, D, F, H, L, M, S, U, W, Y. Their subtotal from the first, second, third and fifth applications respectively are 34.15%, 34%, 32.735% and 32.2% with a displayed average 33.3%. The nine letters on the low frequency row are B, G, J, K, P, Q, V, X, Z. Their subtotal percentages from the first, second, third and fifth applications respectively are 7.56%, 8%, 7.252% and 7.9% with a displayed average 7.7%. The 13 letters on one hand (letter "A" side) are A consecutively through L inclusive plus N. Their subtotal percentages from the first, second, third and fifth applications respectively are 56.88%, 57%, 56.803% and 55.7% with a displayed average 56.6%. The 13 letters on the other hand (letter "Z" side) are M plus O consecutively through Z inclusive. Their subtotal percentages from the first, second, third and fifth applications respectively are 43.12%, 43%, 43.178% and 44.3% with a displayed average 43.4%.

Table 28 (Final Keyboard Configuration System Letters Layout) is but one embodiment of the case 317 solution. There are 12 possible justified configurations of this solution. The options contributing to these configurations are identical to those previously cited in Table 16 (12 configurations defined by one solution) and therefore are not restated here. Table 28 illustrates a left to right ascending alphabet sequence. The sets of letters justified right on both the center and bottom rows do overlay four special symbol keys of the QWERTY layout. These special keys were located in column 10 of the center row and in columns 08, 09 and 10 of the bottom row. Table 28 shows that keys are available for relocated special symbols in positions 01, 09 and 10 of the top row and in position 01 of the bottom row.

TABLE 28

FINAL KEYBOARD CONFIGURATION SYSTEM LETTERS LAYOUT CASE 317

| COLUMN | BOTTOM ROW | CENTER ROW | TOP ROW |
|---|---|---|---|
| LEFT | | | |
| 01 | | C | |
| 02 | B | D | A |
| 03 | G | F | E |
| 04 | J | H | I |
| 05 | K | L | N |
| 06 | P | M | O |
| 07 | Q | S | R |
| 08 | V | U | T |
| 09 | X | W | |
| 10 | Z | Y | |
| RIGHT | | | |

Table 29 (Final Translation of QWERTY Letters and four Special Symbol Keys) lists the before and after condition of 30 keys for case 317. The letter E is the only key that is not relocated, and this situation is emphasized by an equal sign. There are 21 letters that convert to different letters. There are four special symbol keys that convert to letters. There are four letters that convert to special symbol keys. The choice of special symbol keys for the after condition is an elective action as follows. The comnma/less than and period/greater than special symbol keys are treated as a side-by-side pair for relocation to the top row. The slash question special symbol key is also relocated to the top row, while the semicolon/colon special symbol key is relocated to the bottom row.

TABLE 29

FINAL TRANSLATION OF QWERTY LETTERS AND 4 SPECIAL SYMBOL KEYS CASE 317

| QWERTY | KEYBOARD CONFIGURATION SYSTEM |
|---|---|
| A | C |
| B | K |
| C | G |
| D | F |
| E | = E |
| F | H |
| G | L |
| H | M |
| I | T |
| J | S |
| K | U |
| L | W |
| M | Q |
| N | P |
| O | Comma Less |
| P | Period Greater |
| Q | Slash Question |
| R | I |
| S | D |
| T | N |
| U | R |
| V | J |
| W | A |
| X | B |
| Y | O |
| Z | Semicolon Colon |
| Comma Less | V |
| Period Greater | X |
| Slash Question | Z |
| Semicolon Colon | Y |

Table 30 shows a comparison table for the various different frequency ranking alphabets.

TABLE 30

SUMMARY ANALYSIS OF 480 (96 × 5) CASES
Crossindexing Competitive Case Numbers By Solution And Source Of Letter Frequency Distribution

| | Author | | | | |
|---|---|---|---|---|---|
| Solution | Gaines | Kahn | Pratt | Smith | Milliken |
| 4 Demerits (10 column max.) | Case #061 | No Case | No Case | No Case | No Case |
| 4 Demerits (9 column max.) | Case #053 | Case #153 | No Case | No Case | No Case |
| 3 Demerits (10 column max.) | No Case | Case #196 | Case #296 | Case #396 | No Case |
| 2 Demerits (10 column max.) | No Case | No Case | No Case | Case #317 | No Case |

Figure 25:
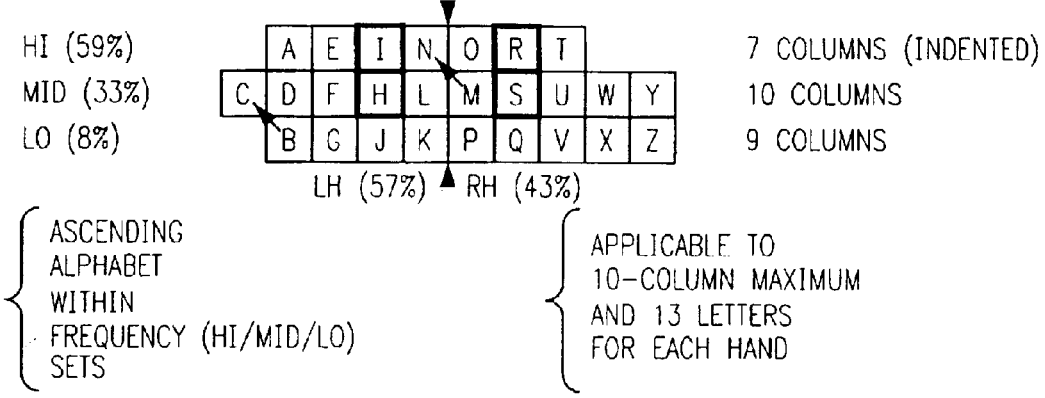
Figure 26:
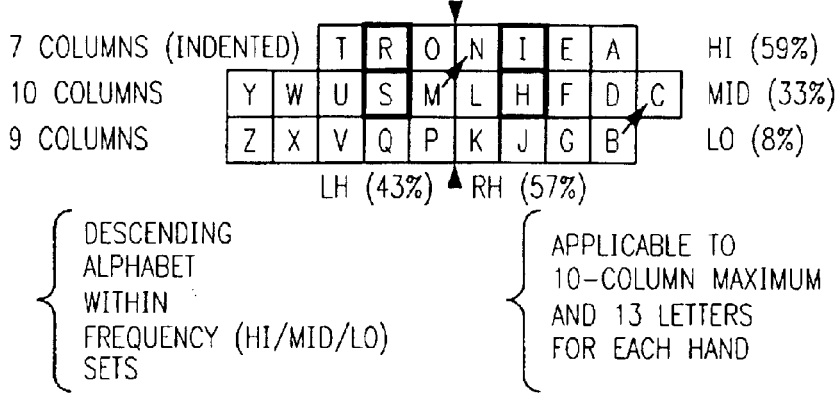
Figure 27:
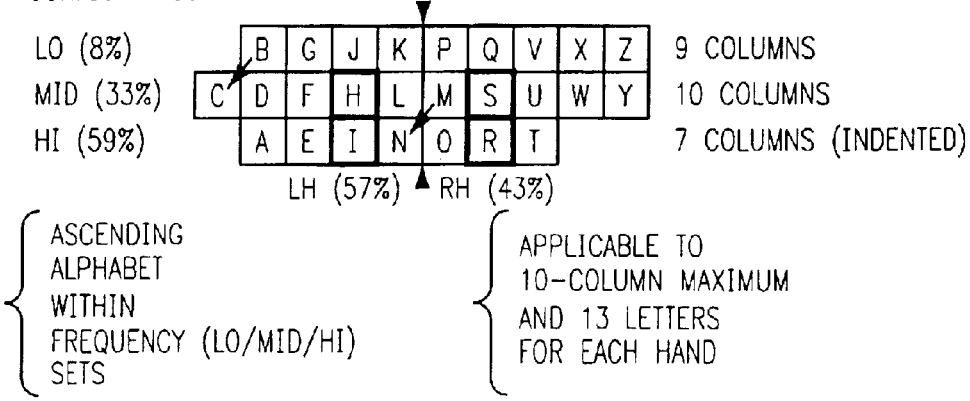

Figures are provided for eight configurations of the final layout arising from case 317 as FIGS. 25–32. In these figures the high frequency row is either adjacent the middle frequency row by being directly above or directly below the middle frequency row. FIG. 25 shows that configuration XXXVII has a 10-column maximum, ascending alphabet, within high, middle and low frequency sets, and 13 letters for each hand. FIG. 26 shows that configuration XXXVIII has a 10-column maximum, descending alphabet within high, middle and low frequency sets, and 13 letters for each hand. FIG. 27 shows that configuration XXXIX has a 10-column maximum, and ascending alphabet, within low, middle and high frequency sets, and 13 letters for each hand. FIG. 28 shows that configuration XL has a 10-column maximum, descending alphabet, within low, middle and high frequency sets, and 13 letters for each hand.

FIG. 29 shows that configuration XLI has a 10-column maximum, ascending alphabet within middle, high and low frequency sets, and 13 letters for each hand. FIG. 30 shows that configuration XLII has a 10-column maximum, descending alphabet, within middle, high and low frequency sets, and 13 letters for each hand. FIG. 31 shows that configuration XLIII has a 10-column maximum, ascending alphabet, within low, high and middle frequency sets, and 13 letters for each hand. FIG. 32 shows that configuration XLIV has a 10-column maximum, descending alphabet, within low, high and middle frequency sets, and 13 letters for each hand.

Figures are not provided for four configurations of the final layout. In these configurations the low frequency set of letters is always on the center row. Configuration XLV has a 10-column maximum, 13 letters for each hand, ascending alphabet within high, low and middle frequency sets. Configuration XLVI has a 10-column maximum, 13 letters for each hand, descending alphabet within high, low and middle frequency sets. Configuration XLVII has a 10-column maximum, 13 letters for each hand, ascending alphabet within middle, low and high frequency sets. Configuration XLVIII has a 10-column maximum, 13 letters for each hand, descending alphabet within middle, low and high frequency sets.

As set forth above, the Keyboard Configuration System provides reliable and predictable means by which efficient keyboards may be achieved for written languages having phonetic alphabets. Although the English language is used as an example, it is contemplated that the Keyboard Configuration System is as readily applicable to any other phonetic alphabet. A machine-implemented process may readily determine a preferred keyboard or sets of keyboards by implementing the present System. Languages other than those using phonetic alphabets may be susceptible to the present System with keyboards arising that are frequency-biased according to a standard or other linear progression akin to alphabetization.

An example of an additional variation of the present invention pertains to the centerline in Keyboard Configuration System FIGS. 1–32. The centerline is indicated by two arrows separating the left hand and right hand activity. In prior art FIGS. 33–34 the split between left hand and right hand would normally fall midway along the 10 keys of the bottom row. Keyboard Configuration System solutions with a maximum of 9 columns are most susceptible to a possible sideways realignment of the centerline.

Another example of an additional variation of the present invention pertains to those columns in Keyboard Configuration System FIGS. 1–32 that are filled with less than 3 letters. FIGS. 29–30 depict letters C, W, and Y on the top row. Letter C leads letter D, and letters W and Y follow letter U. If letters C, W, and Y are repositioned downward to the center row, then two different situations occur. Letters W and Y follow letter T, maintaining the appropriate ascending or descending sequence. However, letter C is adjacent to letter A, disrupting the appropriate ascending or descending sequence. This anomaly is due to the existing demerit-related backward progression from letter B to letter C. It should be noted that the vertical repositioning of letters within a column does not change (increase) the demerit tallies.

While the present invention has been described with regards to particular embodiments, it is recognized that additional variations of the present invention may be devised without departing from the inventive concept.

What is claimed is:

1. A method for efficiently configuring a keyboard representing letters of an alphabet of a language, the steps comprising:

determining a frequency for each letter of the alphabet as used in the language to provide a frequency-ordered list;

applying said frequency-ordered list to a keyboard where each letter is represented by a key to provide a keyboard configuration;

evaluating said keyboard configuration for departures from alphabetical adjacency;

repeating said evaluating step for all possible keyboard configurations available through said step of applying said frequency-ordered list; and selecting a keyboard configuration having a minimal number of departures from alphabetical adjacency; whereby a keyboard configuration is achieved maximizing frequency of use in the language and alphabetical adjacency.

2. A method for efficiently configuring a keyboard representing letters of an alphabet of a language as set forth in claim 1, the steps further comprising:

said keyboard configuration achieved is easy to learn because it is in generally alphabetical order and is easy to use because the keys most frequently used in the language are readily available to a typist.

3. A method for efficiently configuring a keyboard representing letters of an alphabet of a language as set forth in claim 1, the steps further comprising:

dividing said frequency-ordered list into a number of rows, each row being a sub-part of said list.

4. A method for efficiently configuring a keyboard representing letters of an alphabet of a language as set forth in claim 3, the steps further comprising:

independently alphabetizing each of said rows.

5. A method for efficiently configuring a keyboard representing letters of an alphabet of a language as set forth in claim 4, wherein said step of applying said frequency-ordered list further comprises:

arranging appropriate ones of said rows into an alphabet string having a unique one of each letter of the alphabet and applying said alphabet string.

6. A method for efficiently configuring a keyboard representing letters of an alphabet of a language as set forth in claim 1, wherein said departure from alphabetical adjacency further comprises:

a backward movement one column or more in a direction opposite that of an alphabetical direction defined by said keyboard configuration.

7. A method for efficiently configuring a keyboard representing letters of an alphabet of a language as set forth in claim 1, wherein said departure from alphabetical adjacency further comprises:

an excess forward movement two columns or more in a direction the same as that of an alphabetical direction defined by said keyboard configuration.

8. A method for efficiently configuring a keyboard representing letters of an alphabet of a language, the steps comprising:

determining a frequency for each letter of the alphabet as used in the language;

arranging the letters in order of said frequency to provide a frequency-ordered list;

dividing said frequency-ordered list into a number of rows, each row being a sub-part of said list;

independently alphabetizing each of said rows;

arranging appropriate ones of said rows into an alphabet string having a unique one of each letter of the alphabet;

applying said alphabet string to a keyboard layout where each letter is represented by a key to provide a keyboard configuration;

evaluating said keyboard configuration for departures from alphabetical adjacency by assessing a demerit for each a backward movement one column or more in a direction opposite that of an alphabetical direction defined by said keyboard configuration and by assessing a demerit for each excess forward movement two columns or more in a direction the same as that of an alphabetical direction defined by said keyboard configuration;

repeating said evaluating step for all possible keyboard configurations available through said step of applying said alphabet string; and selecting a keyboard configuration having a minimal number of departures from alphabetical adjacency; whereby a keyboard configuration is achieved maximizing frequency of use in the language and alphabetical adjacency, said keyboard configuration achieved being easy to learn because it is in generally alphabetical order and is easy to use because the keys most frequently used in the language are readily available to a typist.

* * * * *